United States Patent
Wentker et al.

(10) Patent No.: US 10,366,564 B1
(45) Date of Patent: Jul. 30, 2019

(54) PERSONAL GAMING TERMINAL USED IN POSSESSION OF PLAYER

(71) Applicant: Tapcentive, Inc., San Francisco, CA (US)

(72) Inventors: David Wentker, San Francisco, CA (US); Mike Lindelsee, Redwood City, CA (US); Kenneth E. Irwin, Jr., Dawsonville, GA (US)

(73) Assignee: Tapcentive, Inc., San Francisco, CA (US)

( * ) Notice: Subject to any disclaimer, the term of this patent is extended or adjusted under 35 U.S.C. 154(b) by 0 days.

(21) Appl. No.: 16/291,528

(22) Filed: Mar. 4, 2019

Related U.S. Application Data

(60) Provisional application No. 62/639,523, filed on Mar. 7, 2018.

(51) Int. Cl.
| | |
|---|---|
| *G07F 17/32* | (2006.01) |
| *H04L 9/32* | (2006.01) |
| *H04L 9/14* | (2006.01) |
| *H04W 12/06* | (2009.01) |
| *G06K 19/06* | (2006.01) |
| *H04W 12/00* | (2009.01) |

(52) U.S. Cl.
CPC ... *G07F 17/3241* (2013.01); *G06K 19/06028* (2013.01); *G06K 19/06037* (2013.01); *G06K 19/06187* (2013.01); *G07F 17/3225* (2013.01); *H04L 9/14* (2013.01); *H04L 9/3234* (2013.01); *H04L 9/3247* (2013.01); *H04W 12/0013* (2019.01); *H04W 12/06* (2013.01); *G07F 17/329* (2013.01)

(58) Field of Classification Search
CPC ...................................................... G07F 17/32
See application file for complete search history.

(56) References Cited

U.S. PATENT DOCUMENTS

| | | | |
|---|---|---|---|
| 7,867,075 | B2 | 1/2011 | Irwin, Jr. et al. |
| 7,959,503 | B2 | 6/2011 | Streeter et al. |
| 8,033,905 | B2 | 10/2011 | Irwin, Jr. et al. |
| 8,408,986 | B2 | 4/2013 | Irwin, Jr. et al. |
| 8,915,780 | B2 | 12/2014 | Irwin, Jr. et al. |
| 9,405,984 | B2 | 8/2016 | Irwin, Jr. et al. |

(Continued)

OTHER PUBLICATIONS

Parke et al., "Cashless and cart-based technologies in gambling: A review of the literature," Centre for the Study of Gambling University of Salford, 2008. Retrieved on (Apr. 21, 2019). Retrieved from <URL: http://usir.salford.ac.uk/id/eprint/18206/11Review_Cashless_Card_Technology_Gambling_Parke_2008.pdf>entire document.

(Continued)

*Primary Examiner* — Omkar A Deodhar
(74) *Attorney, Agent, or Firm* — Panitch Schwarze Belisario & Nadel

(57) ABSTRACT

A system allows consumers to participate in draw games through the use of a personal, portable, secure, device (portable microprocessor) that accepts and stores wagers selected by a consumer, generates wagers on behalf of the consumer, and maintains secure virtual tickets for the consumer that can be authenticated and accepted by a gaming authority. The portable microprocessor interacts with either a user's mobile device or with a game terminal, which, in turn, communicates with a game server.

13 Claims, 16 Drawing Sheets

(56) References Cited

U.S. PATENT DOCUMENTS

| | | |
|---|---|---|
| 9,558,622 B2 | 1/2017 | Irwin, Jr. et al. |
| 9,639,865 B2 | 5/2017 | Shenker et al. |
| 9,666,023 B2 | 5/2017 | Irwin, Jr. |
| 9,911,274 B2 | 3/2018 | Shenker et al. |
| 2005/0181875 A1 | 8/2005 | Hoehne et al. |
| 2008/0045342 A1* | 2/2008 | Crowder, Jr. ......... G06F 9/4403 463/42 |
| 2008/0200225 A1* | 8/2008 | Walker .................... G07F 17/32 463/7 |
| 2013/0260861 A1 | 10/2013 | Vann et al. |
| 2013/0267297 A1 | 10/2013 | Aligizakis et al. |
| 2016/0171822 A1 | 6/2016 | Spencer, II |
| 2017/0024962 A1 | 1/2017 | Shenker et al. |
| 2018/0151026 A1 | 5/2018 | Shenker et al. |

OTHER PUBLICATIONS

Int'l Search Report and Written Opinion dated May 14, 2019 in Int'l Application No. PCT/US2019/020555.

* cited by examiner

PERSONAL GAMING TERMINAL USED IN POSSESSION OF PLAYER

CROSS-REFERENCE TO RELATED APPLICATION

This application claims the benefit of U.S. Provisional Patent Application No. 62/639,523 filed Mar. 7, 2018, which is incorporated herein by reference in its entirety.

FIELD OF THE INVENTION

The present invention is an innovation of control mechanisms for enhancing lottery ticketing and other wagering systems enabling hereto unknown functionality. Specifically, this innovation enables players (also, referred to interchangeably as "consumers") to participate in lottery and other gaming venues through the use of a personal, portable, secure, device that accepts and stores wagers selected by a player, generates bets on behalf of a player, and maintains secure virtual tickets or bet slips for the player that can be authenticated and accepted by a lottery or gaming authority in a manner compatible with today's lottery and/or gaming ticketing systems that typically rely on paper play slips, paper tickets, and physical terminals installed in fixed locations.

BACKGROUND

According to the World Lottery Association (WLA), members which include all major state and national lotteries worldwide, generated over $260B in sales in 2015. If we assume an average game costs $2, and even accounting for a percentage of pure digital games where no paper ticket is issued, it's possible that the 2015 sales resulted in well over 100 billion paper tickets. When it is considered that lotteries utilize expensive specialized security paper to print payable on demand tickets or documents (the vast majority of which are never redeemed) the corresponding costs can be in the tens of millions of dollars.

In addition to the amount of paper consumed by the lottery industry every year to control security and prevent fraud, lotteries must carefully control specialized terminals to print and validate payable on demand tickets or documents. The cost to build, operate, and maintain these terminals in physically secure locations with reliable power and a secure data connection means that lotteries are forced to make difficult business decisions about what locations can support the costs and infrastructure requirements. Access to ticketing is also limited not just by the number of locations, but also by the operating hours of the retail locations where the terminals are installed.

Similar problems involving paper and terminal logistics also exist in other gaming venues worldwide. For example, in the United States around $10 billion United States Dollars (USD) are wagered on horse racing annually (circa 2016) with the United Kingdom (UK) and Japan wagering the equivalent of around $16 billion USD and $22.5 billion USD respectively. These horse racing wagering venues experience problems comparable to lotteries in that almost all horse racing venues employ specialized betting terminals and print payable on demand bet tickets in real time. Of course, lotteries and horse racing venues are not the only gaming systems that experience this sort of logistical problem; usually any form of draw game wagering (i.e., where a wager is made on the outcome of some future drawing or event—e.g., dog racing, sports betting, virtual sports betting, Keno) is enabled by these types of paper and terminal systems.

In response to the limitations imposed by today's paper wagering systems, many solutions have been offered that remove all aspects of physical ticketing—paper or otherwise. In these solutions, the entire process for purchasing, viewing, and redeeming wager tickets is done via the Internet or a mobile phone. In such solutions, the purchase is completed via the Internet where the player accesses a designated gaming web site via a personal computer or mobile phone. The purchases are made following a detailed online registration process to ensure that players are of legal age, possess a valid bank account or debit card for the purchase, and located within the jurisdiction of the gaming venue. In the case of horse racing, the online registration process is referred to as Advanced Deposit Wagering or ADW where the player must deposit funds into a holding account and then use those funds for betting. Following the placement of a wager initiated from one of these online accounts, the player's tickets are generated and stored in a digital application such as the gaming web site or associated mobile application. Additionally, these types of solutions are typically highly regulated, consequently with limited availability.

While such solutions may provide convenience for some players, they discourage other players and create new avenues for fraudsters to digitally attack gaming venues. Attacks on web sites and mobile applications are well known and continue to present significant threats to all businesses. These solutions also introduce challenges for players who prefer to wager anonymously using cash as well as for players who have concerns that a purely digital representation of their ticket in the "cloud" opens up the possibility of being denied a win. With a purely digital solution, without any payable on demand ticket or document, proving that a player has participated in the game relies entirely on digital data and software, which some players fear may be modified at any time or fail resulting in the loss of their potentially winning virtual wager. Also, these solutions prohibit or at the very least discourage impulsive wagers where a player may make an occasional wager (e.g., when his or her favorite team is playing a significant game) but does not wish to go through the inconvenience of authentication to a system and establishing a long-term account.

What is needed is a completely new solution to securely manage the generation and validation of digital gaming tickets or documents that includes a secure and reliable payable on demand hardware device addressing the shortcomings of paper systems while still providing a physical embodiment for the player to possess and ensure confirmation of wagers. The ideal system is one that does not impose any special requirements on sales in terms of physical infrastructure, power, light, etc. and does away with antiquated and fraud-prone paper ticketing terminals. The ideal solution is one that involves a portable, low cost, tamper-resistant, secure digital ticketing and storage device which is provided to and operated by players, not by gaming retailers as is typically done in today's gaming systems.

It is important to note that this ideal type of solution is not a simple, digital storage device, memory stick, etc. In order for a solution to work reliably and securely, it must include dedicated functionality and security compatible with or exceeding existing proprietary gaming terminals. For example, a new solution must support communication and transactional exchanges with existing central gaming systems in a manner similar to the transactional exchanges between existing paper ticketing terminals and central gaming systems. Such a device would ideally also include specialized cryptographic capabilities that enable central gaming systems to recognize the authenticity of these devices and the authenticity of each unique digital ticket that they generate just as they are able to do with today's fixed-location paper ticketing terminals.

With such a device, every person who engages in gaming venues has the means to securely generate their own authentic tickets or documents that existing central gaming systems can accept just as they accept such requests from their own terminals installed in retail locations today. In addition, assuming this ideal device is personal, it can also serve as the secure storage medium for pre-purchased play credits and physical proof of participation for any tickets generated by the device.

SUMMARY OF THE INVENTION

Objects and advantages of the invention will be set forth in part in the following description, or may be obvious from the description, or may be learned through practice of the invention. Described are mechanisms, systems, and methodologies related to lottery ticketing processes, enabling hitherto unknown levels of functionality, security, and flexibility. These new ticketing mechanisms, systems, and methodologies are implemented in a manner that both expands functionality while ensuring compatibility with existing systems and regulations.

In summary, this invention enables an innovative concept—a Personal Gaming Terminal (also, referred to herein interchangeably, as "PGT" or "PGT device" or "portable microprocessor" or "PGT microprocessor"). A PGT allows gaming authorities to significantly expand retailer distribution as any retailer can sell these devices. Putting these devices in players' hands also leads to expanded player participation. Both of these benefits will lead to increased revenue for lotteries and other gaming authorities. Additionally, this invention will also increase profits by removing capital and operating costs related to existing paper terminal systems while virtually eliminating fraud from counterfeit tickets, something nearly impossible to prevent in paper systems.

In essence, the invention creates a secure payable on demand physical-to-digital hybrid solution that offers players the convenience of digital wagering on draw games without forcing those players to trust a purely digital software solution. For these players, such a solution offers the convenience of being able to securely and reliably wager in a gaming venue at any time without the need to find an authorized location while still delivering the piece-of-mind that something physically in their possession, which is issued by the gaming authority, provides with authentic proof of participation and reliable validation of winnings In a preferred embodiment a Personal Gaming Terminal, or PGT is disclosed that is implemented based on tamper-resistant microprocessor hardware embedded in an ISO/IEC 7810 ID-1 standard plastic card. These cards are often referred to as "smart cards" and each is a unique device with specially designed firmware created to deliver device-specific functionality. In other alternative embodiments, PGTs with other underlying circuit designs and packaging in non-card form factors may also be implemented. However, with the preferred smart card embodiment building on an established secure hardware platform results in efficiencies in device production, hardware security certification, and communications unknown to other non-standard alternative embodiments.

In a specific preferred embodiment, the PGT is manufactured with an ISO/IEC 14443 contactless communications interface which enables the PGT to communicate with any ISO/IEC 14443 capable reader as is typically included in Point-Of-Sale (POS), Automated Teller Machine (ATM), and kiosk systems. This ISO/IEC 14443 interface also enables the PGT to communicate with any Near Field Communication (NFC) enabled mobile phone or device.

In this specific preferred embodiment, the PGT is distributed by a gaming authority and sold through authorized retailers. Players purchase the PGT from a retailer, preferably where the PGT includes a variable number of game play credits that can used at any time in the future. In these specific preferred and other embodiments, the PGT must be digitally activated in conjunction with its sale before it can be used.

For example, once the player has purchased the specific preferred embodiment PGT, the player would typically download an authorized mobile application provided by the gaming provider to their NFC-enabled mobile device to interact with and provide the user interface to the PGT. This mobile application provides the user interface to the PGT where the player is able to select his or her draw game wager and then, holding their PGT within range of their NFC enabled mobile device, initiate the secure ticketing process based on the player's wager. The PGT typically validates that sufficient play credits are available within the PGT and then generates a cryptographically secure digital ticket that includes identification information about the PGT passing this information (via NFC) to the mobile application. The mobile application typically makes use of its Wi-Fi or cellular data Internet connection to deliver the digital ticket to the gaming operator's central gaming system referred to herein as a "central site." The central site then confirms receipt of the ticket and entry into the drawing.

If the digital ticket submitted by the player results in a win after the drawing is complete, the PGT serves as a payable on demand bearer instrument, similar to prior art paper tickets albeit with much greater security. In this embodiment, the player simply presents the PGT at an authorized retailer or gaming office to validate the winning digital ticket embodied within the PGT and garner the appropriate winnings. As with the ticketing process, the validation process involves secure communication between the PGT and the central site to ensure that the PGT is authentic and that the winning ticket contained within the PGT matches the archival data previously submitted to the central site.

If the player has exhausted all of his play credits on the PGT, the device may be returned to an authorized gaming retailer to purchase additional play credits. In this embodiment, the gaming terminal would be used to communicate the play credit request to the central gaming system and retrieve additional credits that can be securely updated in the PGT via the gaming terminal.

If the gaming authority allows prize redemptions via the Internet, the player can use the PGT, personal NFC-enabled mobile device, and an Internet connection to the central site to initiate a redemption process that results in the crediting of a registered bank account, debit card, or instant issuance prepaid gift card to collect winnings. This same remote process involving the PGT, mobile app, and Internet connection to the central site could be used to initiate the purchase of additional credits where the purchase is charged to a registered bank account or debit card. Another option that may be allowed by the gaming authority is conversion of prize winnings to new game credits. In this scenario, rather than cashing out the winnings and then using the winnings to purchase additional play credits, the process is automated by the central site at the direction of the player who chooses to convert winnings directly to new play credits.

Described are a number of mechanisms and methodologies that provide practical details for reliably producing a PGT and interfaces to associated systems that offer a more reliable, secure, and dynamic gaming ticketing platform than was previously deemed possible with existing gaming ticketing systems.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1A:
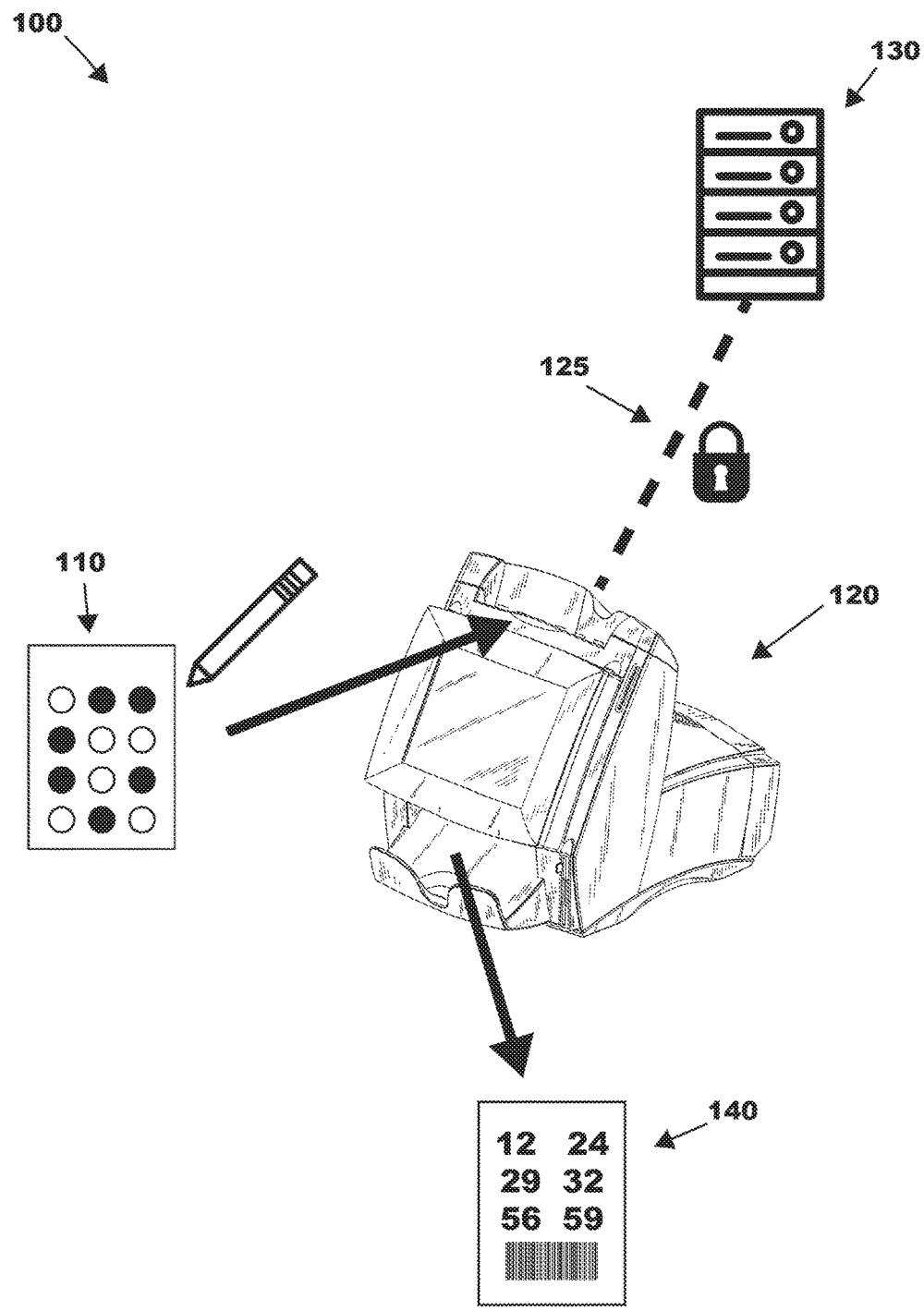
FIG. 1A is an exemplary block diagram of lottery paper ticket generation based on a prior art interface between a lottery ticketing terminal and a lottery central site.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Certain terminology is used herein for convenience only and is not to be taken as a limitation on the present invention. The words "a" and "an", as used in the claims and in the corresponding portions of the specification, mean "at least one." In the context of this invention, discussions utilizing terms such as "providing", "receiving", "responding", "verifying", "challenging", "generating", "transmitting", "authenticating", or the like, often refer to the actions and processes of an electronic computing devices and/or system. The electronic computing device and/or system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

A Personal Gaming Terminal, or "PGT" or "PGT device" as referred throughout this specification refers to a secure physical embodiment of tamper-resistant microprocessor hardware and associated memory that enables non-volatile storage of gaming data and credits that digitally signs and communicates this information securely to another device. Each PGT is a unique device with specially designed firmware created to deliver device-specific functionality. In preferred embodiments, the PGT is implemented in an ISO/IEC 7810 ID-1 standard plastic "smart card", though other designs and packaging in non-card form factors are possible.

An important term used throughout the descriptions is "contactless" which can refer to any ISO/IEC 14443 compatible technology. ISO/IEC 14443 is the technology standard governing a class of short-range radio frequency communications operating at 13.56 MHz. The standard is commonly found in devices such as payment terminals and transit gates that are designed to interact with microprocessor powered smart cards that support the standard. Such cards are often referred to as "contactless cards." An example of the use of the term contactless in the descriptions below is in reference to a contactless reader attached to a gaming terminal. In this context the term contactless refers to an ISO/IEC 14443 compatible reading device integrated in or attached to the terminal to read contactless cards. The ISO/IEC 14443 standard is also incorporated completely within the Near Field Communication (NFC) standard. The NFC standard has been adopted for use in mobile phones. This means that NFC-enabled mobile phones also support the ISO/IEC 14443 contactless communication standard enabling them to interact with payment terminals, transit gates, as well as with contactless cards.

Another important term used in the following descriptions is "game terminal" or "gaming terminal." There are numerous types of gaming terminals in use throughout the world such as: IGT lottery terminals, Scientific Games' lottery terminals, Autotote horse racing terminals, William Hill sports betting terminals, and specialized kiosks. In various embodiments these gaming terminals may be integrated with other point-of-sale equipment such as electronic cash registers or be operated as completely separate standalone devices. As used in the claims and in the corresponding portions of the specification, the common feature of all "gaming terminals" are that these devices include a secure, Internet connection to the central servers of the gaming system that is referred herein as the "central site" or "gaming system." For the purposes of this disclosure, the form of the gaming terminal is not important. The only assumption is that the device is authorized by a gaming authority and includes the aforementioned connection to the central gaming system.

A "consumer mobile device" as used herein is a portable electronic device owned by the player or consumer that is equipped with an interface suitable for communicating with the PGT that also includes Internet access. The communications between the PGT and "consumer mobile device" is preferably of a "contactless" nature such as NFC. Examples of "consumer mobile devices" could include a smartphone (e.g., iPhone, Android phone), tablet computer, or laptop personal computer. However, in some specific embodiments the communications interface may be via direct connection (e.g., Universal Serial bus or "USB").

In the context of this disclosure, either the "game terminal" or "consumer mobile device" or "consumer device" functions as a "separate intermediary device" thereby enabling communications between the PGT and the central site or gaming system. Thus, all communications between the PGT and the central site or gaming system are accomplished by relaying data between the PGT and "separate intermediary device" via one communications interface and the "separate intermediary device" and the central site or gaming system via a second Internet communications interface.

Finally, the term "draw game(s)" as used in the claims and in the corresponding portions of the specification, mean a gambling wager on a future event or "drawing." In the context of this invention, this future event or "drawing" may be a lotto style (e.g., ping pong ball) drawing, a horse race, football or other sporting event, random number selection, etc. The significant concept being that the draw game enables the player to wager on some future event with the outcome of the future event determining if the player wins or loses the wager.

Before describing the present invention, it may be useful to first provide a brief description of the current state of the art in lottery ticketing systems (that are typical to all gaming systems) to ensure that a common lexicon is established of existing technology prior to describing the present invention. This description of the current state of the art of lottery ticketing systems is accompanied by the prior art illustrations of FIGS. 1A and 1B.

With reference now to FIG. 1A, a block diagram of an embodiment of a typical prior art lottery ticketing system 100 is shown for the purchase of lottery draw game tickets. The system consists of: a paper play slip 110, a lottery terminal 120, the lottery central site 130, secure data communication 125 between the lottery terminal 120 and lottery central site 130, and a paper ticket 140 generated by the lottery terminal 120 thereby creating a payable on demand document detailing the pending draw game wager.

Typical of these prior art systems, the lottery players visit authorized lottery retailers where they first complete a paper play slip 110, or alternatively bypass the play slip process entirely and select a "quick pick" (random or pseudorandom selection of draw numbers). After paying the retailer, the retailer accepts the player's play slip 110 and the retailer inserts the completed play slip into the lottery terminal 120 or accepts the quick pick generated by the terminal. The lottery terminal 120 then generates a digital bet request that is communicated via a secure data connection 125 to the lottery central site 130 for acceptance. Once the bet request has been accepted, a digital ticket facsimile is returned via the secure data connection 125 to the lottery terminal 120, which then prints a payable on demand paper ticket 140 that the player must retain to collect any winnings documented by the ticket.

Figure 1B:
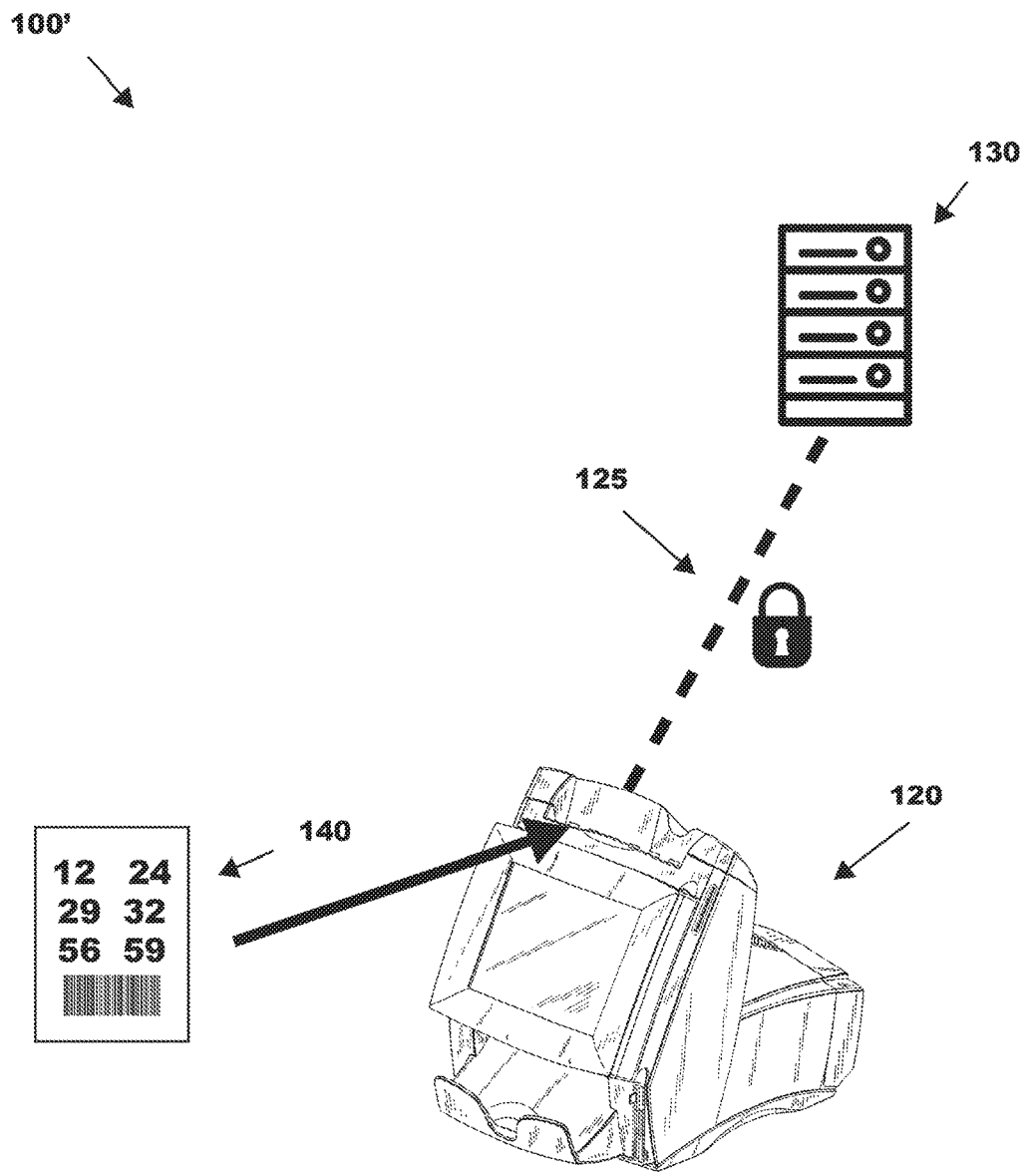
FIG. 1B is an exemplary block diagram of lottery paper ticket validation based on a prior art interface between a lottery ticketing terminal and a lottery central site.

With reference now to FIG. 1B, a block diagram of an embodiment of a typical prior art lottery ticketing system 100' is shown for redemption of winning tickets, which includes some of the components to FIG. 1A. This redemption system consists of: a lottery terminal 120, the lottery central site 130, secure data communication 125 between the lottery terminal 120 and lottery central site 130.

If the player has won a prize, the player returns to an authorized lottery retailer to present the payable on demand paper ticket 140 for validation and redemption. The retailer accepts the paper ticket 140 and scans it into the lottery terminal 120 communicating the ticket information to the lottery central site 130 for validation and confirmation of a win. Once confirmed, the lottery central site 130 sends a message back to the lottery terminal 120 authorizing the retailer to pay the player. If the prize exceeds a certain dollar value (e.g., $600 in most jurisdictions in the United States), the lottery central site 130 sends a message to the lottery terminal 120 notifying the lottery retailer to instruct the player to retain his paper ticket 140 and visit an official lottery office location to collect any prize money.

In addition to disclosing a prior art lottery gaming system for clarity it may be also beneficial to provide a brief description of the current state of the art of contactless smart card technology and associated interactions with NFC-enabled consumer devices to ensure that a common lexicon is established for this existing technology as well. This description of the current state of the art of communications between contactless smart card-based technology and NFC-enabled consumer devices is accompanied by the prior art illustration of FIG. 2.

Adoption of short-range radio frequency (RF) or "near field" radio technology has been accelerated by the creation of the Near Field Communication international technology standard ISO/IEC 18092 and the associated standardization work by the NFC Forum trade association. This NFC standard has been embraced by mobile phone manufacturers resulting in the inclusion of NFC hardware in a broad range of mobile smart phone models. As previously mentioned, because the NFC standard incorporates the widely used contactless technology standard ISO/IEC 14443, the inclusion of NFC in devices results in immediate interoperability with other ISO/IEC 14443 contactless devices. A wide range of devices from payment terminals to consumer electronics and home appliances have integrated processors with ISO/IEC 14443 capabilities thereby opening the way to new interactions and innovations involving NFC-enabled mobile phones with these types of devices. It is this interoperability that enables NFC-enabled mobile phones such as the iPhone to interact with legacy, contactless card-accepting payment terminals for the purposes of executing an Apple Pay payment.

Figure 2:
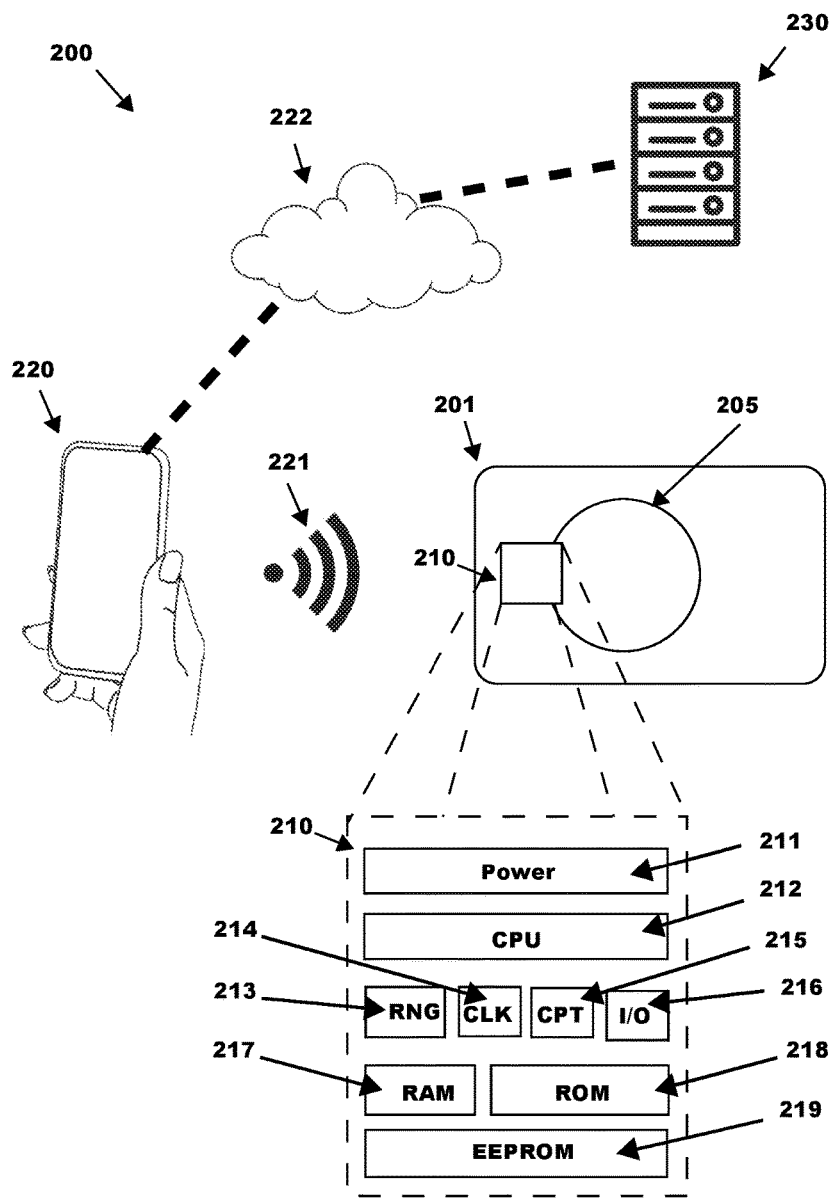
FIG. 2 is an exemplary block diagram of a prior art interface between a microprocessor card with an ISO/IEC 14443 interface communicating with a consumer's NFC-enabled mobile device, where the consumer's mobile device also includes a Wi-Fi or cellular data interface to communicate with any Internet-connected system.

With reference now to FIG. 2, a block diagram of an embodiment of a typical prior art NFC system 200 is shown. The system consists of a smart card 201 with a microprocessor 210 and ISO/IEC 14443 compatible antenna 205, a consumer device 220 (handheld phone shown) with NFC data communication capabilities 221 and an optional Internet connection 222 to a server system 230. The microprocessor 210 communicates 221 with the consumer device 220 via ISO/IEC 14443—a communications standard that is supported both in the smart card 201 and the NFC hardware of the consumer device 220. The consumer device 220 communicates with the server system 230 via a Wi-Fi or cellular data connection 222.

A functional detail of microprocessor 210 includes: Power 211 converter, a Central Processing Unit (CPU) 212, a Random Number Generator (RNG) 213, a connection for an external Clock 214 provided by the I/O port 216, a Cryptographic Coprocessor (CPT) 215, an Input/Output (I/O) port 216, Random Access Memory (RAM) 217, Read-Only Memory (ROM) 218, and Electronically Erasable Programmable Read Only Memory (EEPROM) 219. Device-unique firmware and data can be stored and run from ROM 218 or EEPROM 219 and could, optionally, rely on the support of the RNG 213 and CPT 215 for many of the operations. A microprocessor 210 (e.g., SmartMX designed by NXP or the SLE 77 designed by Infineon) is also typically packaged with multiple physical security measures which give it a degree of tamper resistance which is important when the microprocessor is included in devices designed for use in security-sensitive applications.

One common device form that includes these types of microprocessors as depicted in FIG. 2, 200 is a smartcard 201 where the microprocessor 210 is embedded in a plastic card body. If a Radio Frequency (RF) antenna 205 connected to the microprocessor 210 is also embedded in the card, then the card can be both powered by and communicated with via the ISO/IEC 14443 communications standard.

Thus, in this FIG. 2 illustration 200, the microprocessor 210 is capable of multiple, secure, autonomous operations and is able to communicate with a gaming operator's central site 230 by using the consumer device 220 as a communications conduit or relay. The consumer device 220 plays the role of this conduit by using its NFC capability 221 to communicate with the microprocessor 210 and then relays messages received from the microprocessor 210 to the server system 230 using the Wi-Fi or cellular data communications 222 capability of the consumer device 220. The reverse flow is also possible with a message originating on the central site 230 that is sent to the consumer device 220 which then sends the message on to the microprocessor 210.

One well understood approach to securing communications between two systems, where the data channel between the systems cannot be secured, is sometimes referred to as "end-to-end security." In the context of microprocessor systems such as those illustrated in FIG. 2, end-to-end secure messaging is often set up where all messages exchanged between the microprocessor 210 and some other system such as the central site 230 are secured using symmetrical or asymmetrical cryptographic encryption and decryption to achieve end-to-end security. The goal of the security is to ensure message integrity (i.e., changes to any message content or sequences of messages can be detected), message authenticity (i.e., the message originated from the authorized device), and message secrecy (message content is encrypted so that only the systems on either end of the communication are able to view the original message content). Such implementations typically rely on a combination of a unique identifier in each system, counters that change with each message, and cryptographic keys and associated algorithms that have been pre-agreed between the two systems. In the following descriptions all messaging originating in the microprocessor 210 and terminating in the central site 230 or messaging originating in the central site 230 and terminating in the microprocessor 210 are assumed to follow this end-to-end secure messaging model.

Having concluded the discussion of exemplary prior art in both lottery ticketing and NFC systems, various embodiments of the present invention will now be disclosed. As will be apparent to one skilled in the art, the present invention overcomes many of the inherent disadvantages and limitations of existing gaming ticketing systems.

Figure 3:
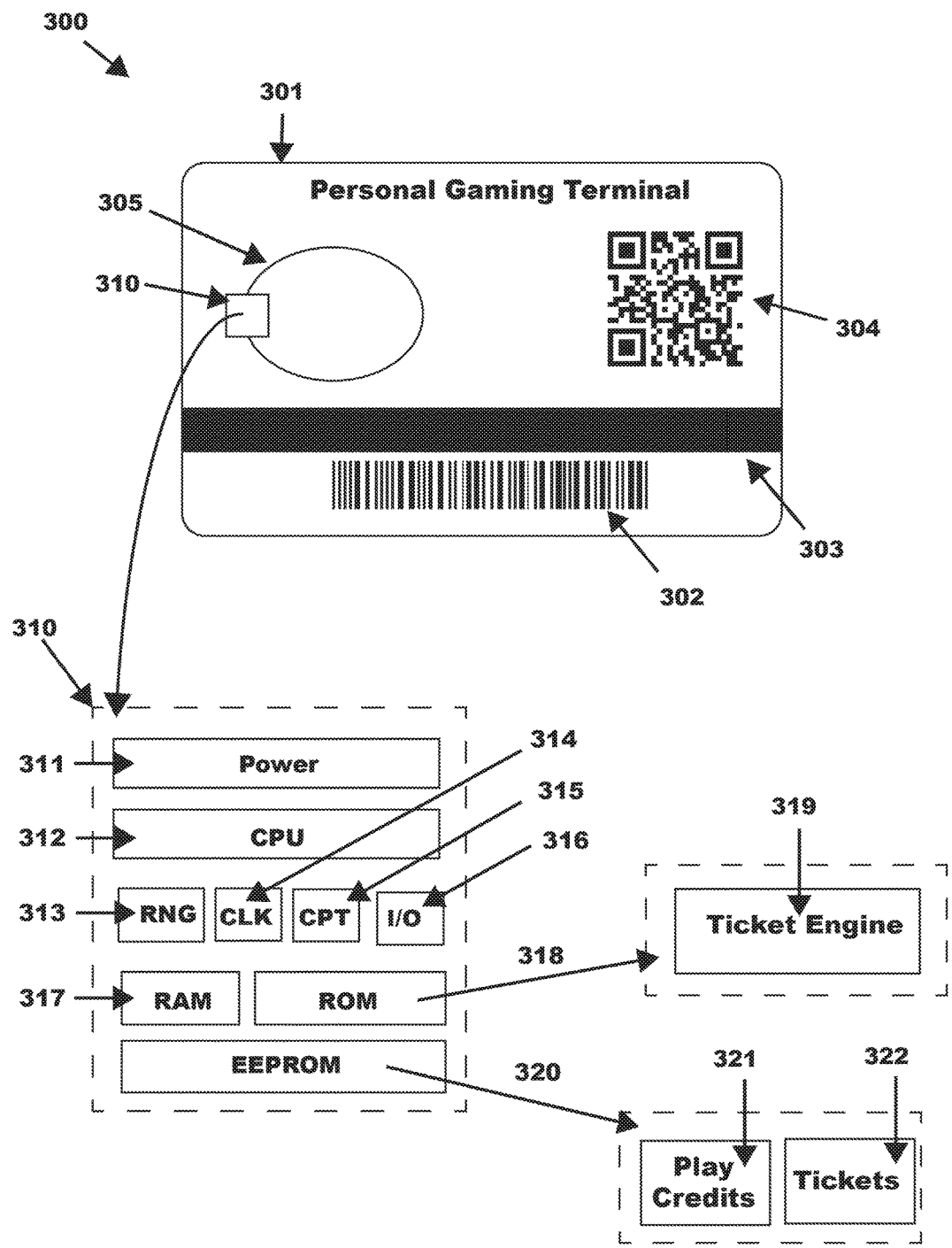
FIG. 3 is a representative schematic graphical overview of a preferred embodiment of a PGT device implemented and packaged as a contactless microprocessor smart card.

In a preferred embodiment 300 of FIG. 3, a Personal Gaming Terminal (PGT) 301 is manufactured and packaged as a contactless smart card. The card includes hardware in the form of a microprocessor 310 and antenna 305 similar to what was described in the prior art 200 illustration of FIG. 2. In this preferred embodiment, PGT-specific functionality includes a secure stored-value purse for managing play or game credits 321, a secure ticket engine 319, and secure ticket storage 322. The PGT-specific functionality 319, 321, and 322 can be integrated into the microprocessor 310 in the ROM 318 or EEPROM 320. One preferred embodiment is shown where the ticket engine is embedded in ROM 318 with play or game credits 321 and tickets 322 embedded in EEPROM 320. Thus, in this preferred embodiment, the PGT 301 provides the consumer essentially with a portable microprocessor 310 packaged as a self-contained plastic smart card with the portability and ruggedness inherent in that package.

The PGT 301 may also include a number of optional, but standard identification technologies separate from the microprocessor 310 that aid in the identification and use of the cards. These technologies may include a one-dimensional barcode 302, a magnetic stripe 303, and/or a QR (Quick Response) code 304. Similar to prior art, the PGT's 300 microprocessor 310 includes a Power 311 converter, a CPU 312, a RNG 313, a Clock 314, an I/O port 316, and a CPT 315, in addition to the RAM 317, ROM 318, and EEPROM 320 memories.

Figure 4A:
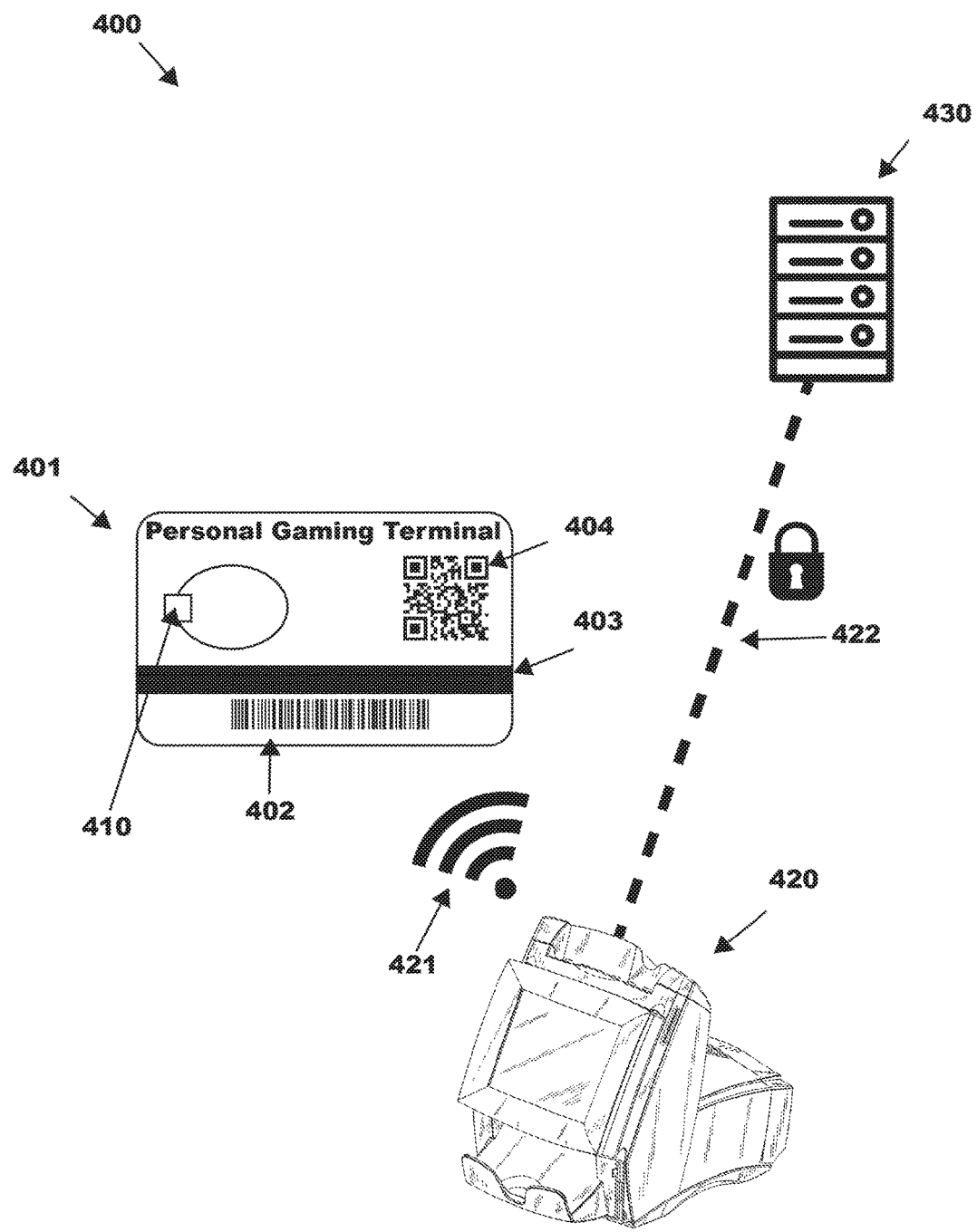
FIG. 4A is a block diagram providing a schematic graphical overview of a general embodiment system for activating and unlocking PGT devices via a gaming terminal.
Figure 4B:
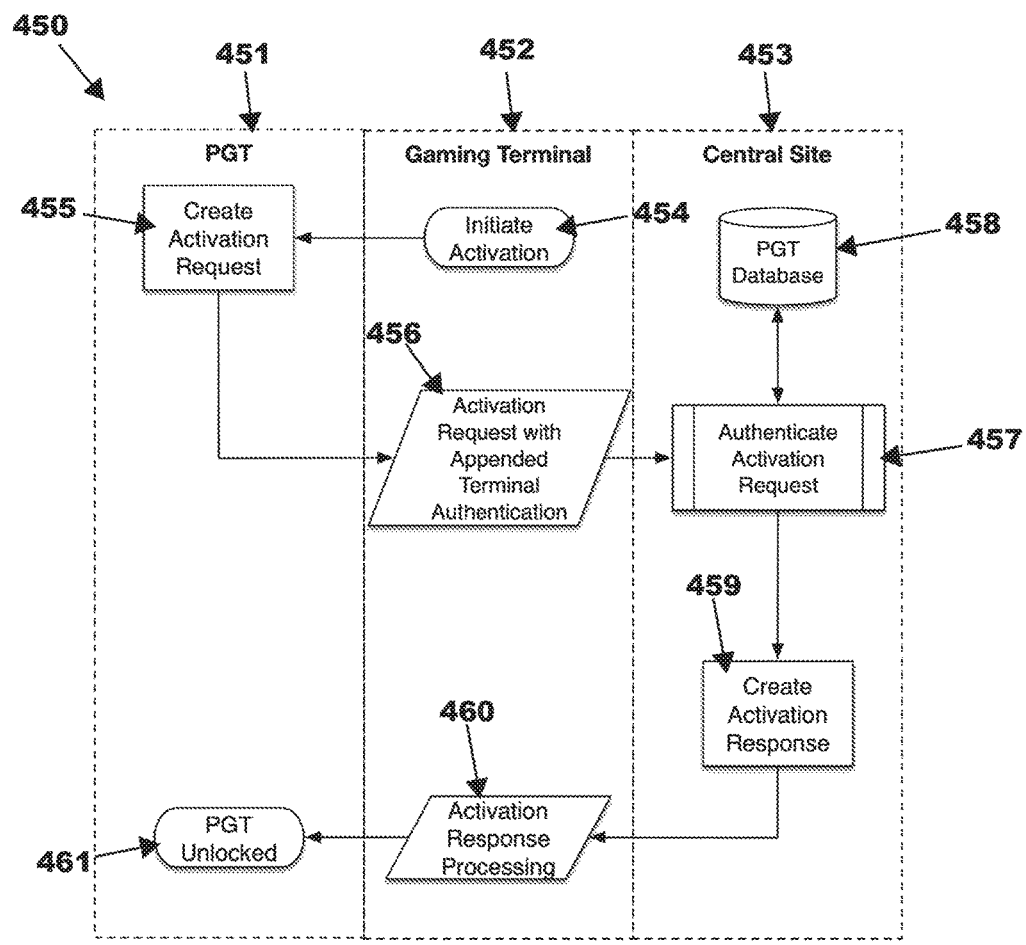
FIG. 4B is a representative example high level architecture swim lane diagram of the key components associated with activating and unlocking PGT devices via a gaming terminal in accordance with the embodiment of FIG. 4A.

FIGS. 4A and 4B taken together, illustrate a general embodiment 400 and 450 of the invention for the activation and unlocking of the PGT in conjunction with its purchase where the gaming terminal includes a contactless reader capability. FIG. 4A is an overall representative example block diagram of the general embodiment 400 illustrating a PGT 401, a gaming terminal 420, and a central site 430 (also, referred to interchangeably as a "game server"). FIG. 4B depicts a "swim lane" flowchart providing a schematic graphical overview 450 of the same embodiment. As illustrated in FIG. 4B, system-level functionality is conceptually divided into three groups (i.e., PGT 451, Gaming Terminal 452, and Central Site 453 (also, referred to interchangeably as a "game server") by the three swim lane columns from left to right. Flowchart functions that appear within a swim lane are limited to the data category of that swim lane.

In this embodiment 400 of FIG. 4A, the PGT 401 is offered for sale in retail environments where the gaming terminal 420 includes a contactless reader capability 421. These environments may include lottery retailers typically located in convenience stores, lottery kiosks, horse race tracks, sports betting venues, Keno venues typically located in bars, etc. In a preferred embodiment, the PGT offered for sale can be displayed in a retail display within easy access of the consumer—i.e., not necessarily in a secure, restricted area, typical of scratch-off lottery tickets. This easy access sales paradigm is possible, because in this preferred embodiment, the PGT 401 microprocessor 410 is manufactured initially in a secure, locked, state which prevents it from functioning until there is a secure activation process involving the central site 430. Thus, the PGT 401 as displayed for sale has no appreciable value and therefore does not have to be kept in a secure display or behind the cashier's counter. Only during the purchase process does the PGT 401 become unlocked and usable via secure cryptographic protocols exchanged between the PGT 401 and the central site 430 using the authorized gaming terminal 420 as a communications conduit.

The gaming terminal 420 includes a contactless reader 421 to communicate with the PGT 401 microprocessor 410 as well as a secure data connection 422 to the central site 430. Once the purchase is complete, the PGT 401 activation and unlock process requires secure messaging between the PGT microprocessor 410 and central site 430. This protocol, conducted through a secure gaming terminal 420, helps to ensure that only legitimately purchased PGT 401 devices can be unlocked and activated since the unlock request will only be honored by the central site 430 if the request originates from a gaming terminal 420 known a priori to the central site 430 e.g., known Internet Protocol (IP) address, shared secret password, registered terminal serial number or Media Access Control (MAC) address.

As shown in system embodiment 400's associated high-level architecture swim lane diagram 450 of FIG. 4B, there are three functional components (i.e., PGT 451, Gaming Terminal 452, and Central Site 453) of the invention embodied in separate devices. Swim lane diagram 450 begins with the gaming terminal 452 starting activation 454 by initiating communications queries via its contactless reader. When the PGT 451 is placed in in close proximity to the gaming terminal's 452 contactless reader, the gaming terminal 452 powers up the PGT 451 and transmits the activation initiation request 454 to the PGT's 451 microprocessor. The PGT's 451 microprocessor responds by creating a secure activation request 455 intended for the central site 453. The PGT's 451 secure activation request 455 is formatted in an a priori known cryptographically secure protocol that is typically a function of the activation initiation request 454 received from the gaming terminal—e.g., the PGT's 451 serial number and/or MAC is appended to the request 454 initiated by the gaming terminal with the entire activation request 455 then encrypted or digitally signed with a key (asymmetrical or symmetrical) a priori known to both the PGT 451 and the central site 453. Once the PGT 451 sends the activation request to the lottery terminal 452, the secure activation request 455 is formatted by the gaming terminal 452 which relays the activation request 456 to the central site 453, typically appending its own authentication data to the request—e.g., the gaming terminal's 452 serial number and/or MAC and transaction counter are appended with the activation request 455 which is then encrypted by the terminal's 452 shared symmetrical key with the central site 453 and transmitted to the central site 453 through a Virtual Private Network (VPN).

When the central site 453 receives the activation request, it typically authenticates 457 the gaming terminal 452 (both the terminal itself as well as checking to determine if the transaction counter is in synchronization) and queries 457 a database 458 to confirm that the PGT 451 requesting activation is valid and confirm the authenticity of the PGT 451 and associated activation request 456. Once confirmed, the central site 453 creates a secure activation response 459 intended only for the specific PGT 451 that initially generated the request 455. This activation response 459 includes an unlock code for the PGT 451 microprocessor that is unique to the specific PGT 451 that was retrieved or calculated from the received request 456 as well as associated information resident in the PGT database 458. The central site 453 returns the activation response 459 to the gaming terminal 460. Once the gaming terminal 452 receives the activation response 459, it then reformats (e.g., strips off terminal unique ancillary data, routing information, decrypts top-level cipher text) and transfers the request 460 to the PGT 451 microprocessor via the contactless reader. When the PGT 451 receives the activation response it validates the authenticity of that response and then applies the included unlock code to unlock 461 itself. At this point the PGT 451 is fully activated, unlocked, and ready for use by the player.

Figure 5A:
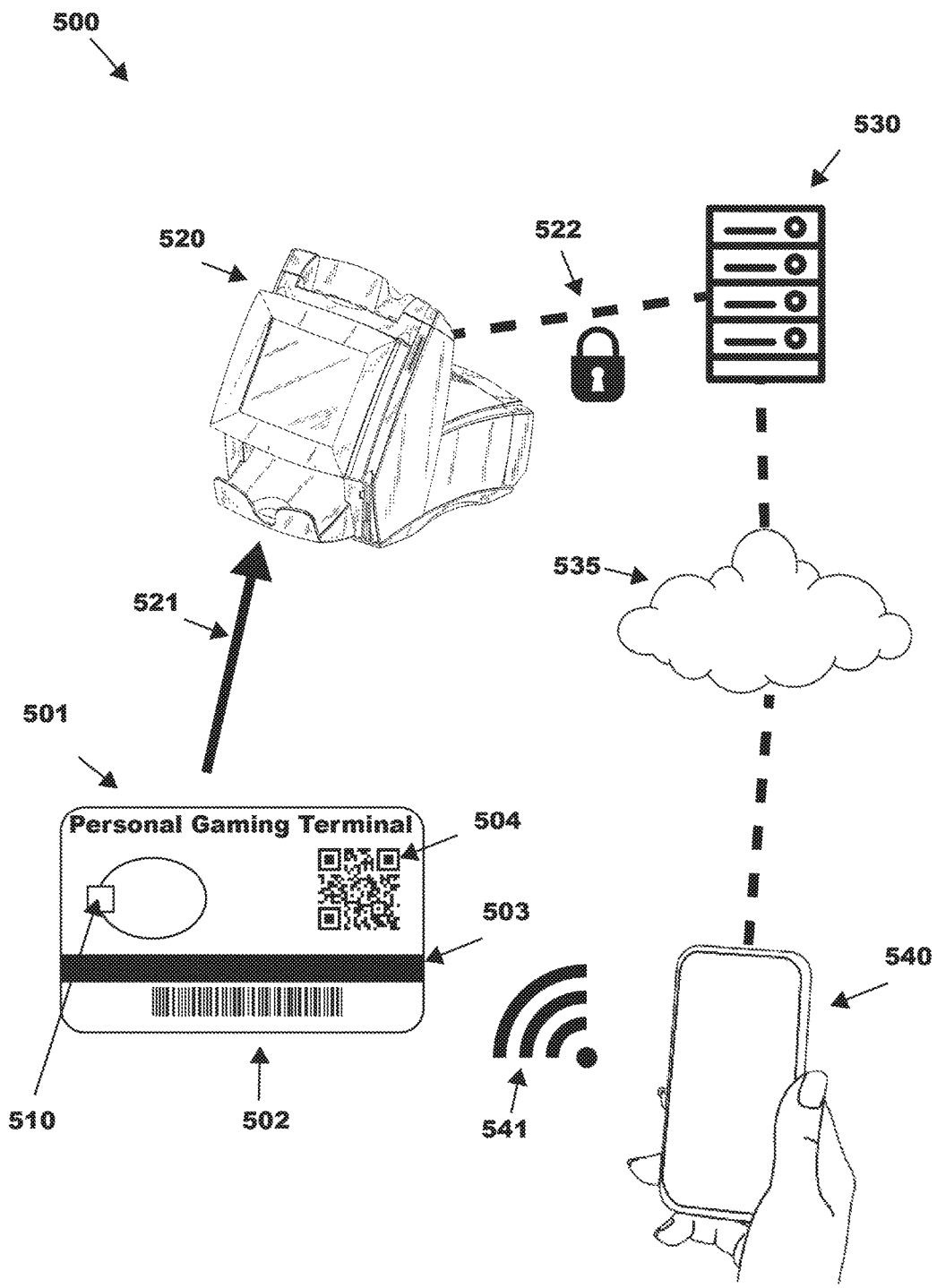
FIG. 5A is a block diagram providing a schematic graphical overview of a general embodiment system for activating and unlocking PGT devices via combination of a gaming terminal and a consumer's mobile device.
Figure 5B:
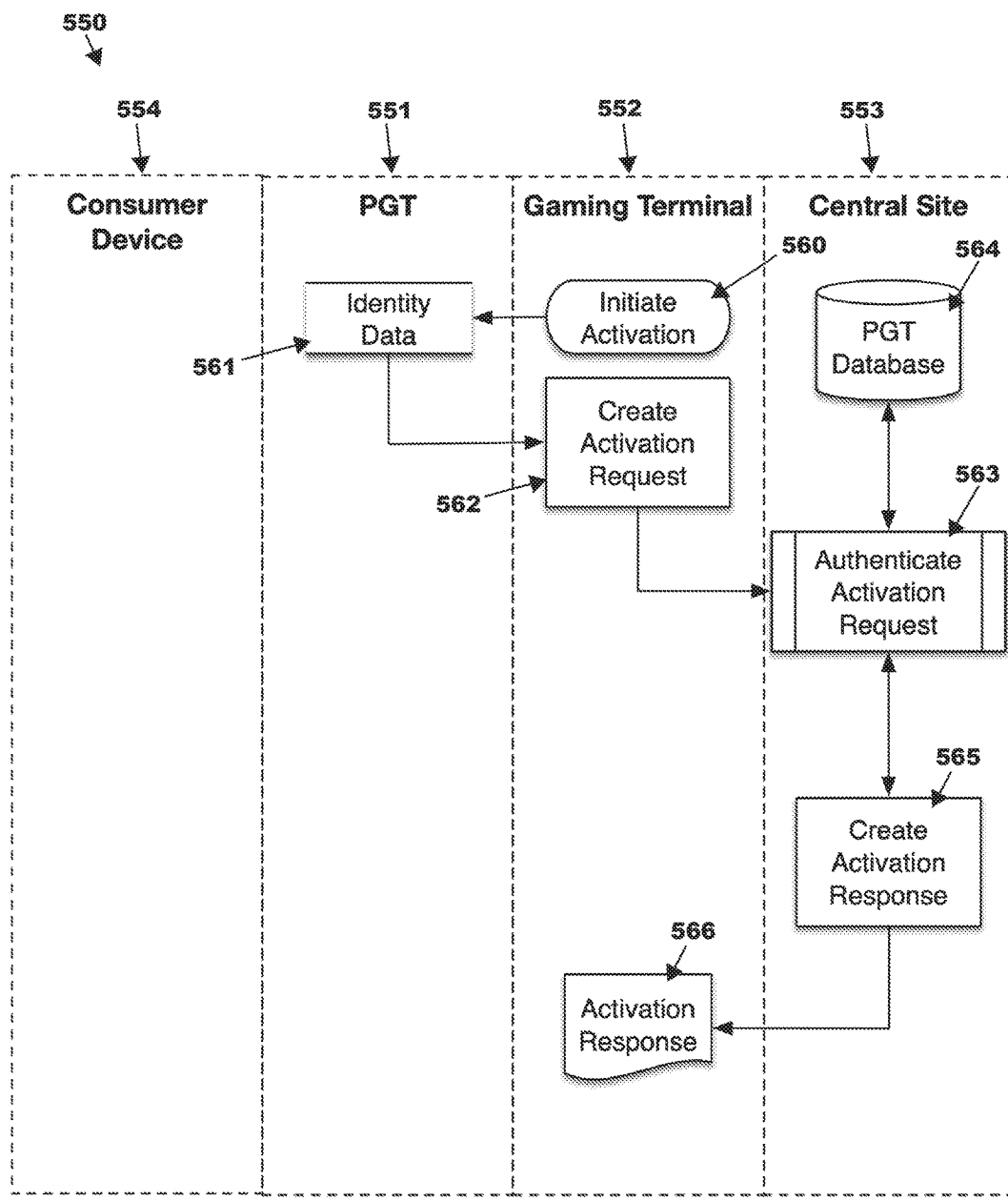
FIG. 5B is a representative example high level architecture swim lane diagram of the key components associated with activating and unlocking PGT devices via a combination of a gaming terminal and a consumer's mobile device in the first stage in accordance with the embodiment of FIG. 5A.
Figure 5C:
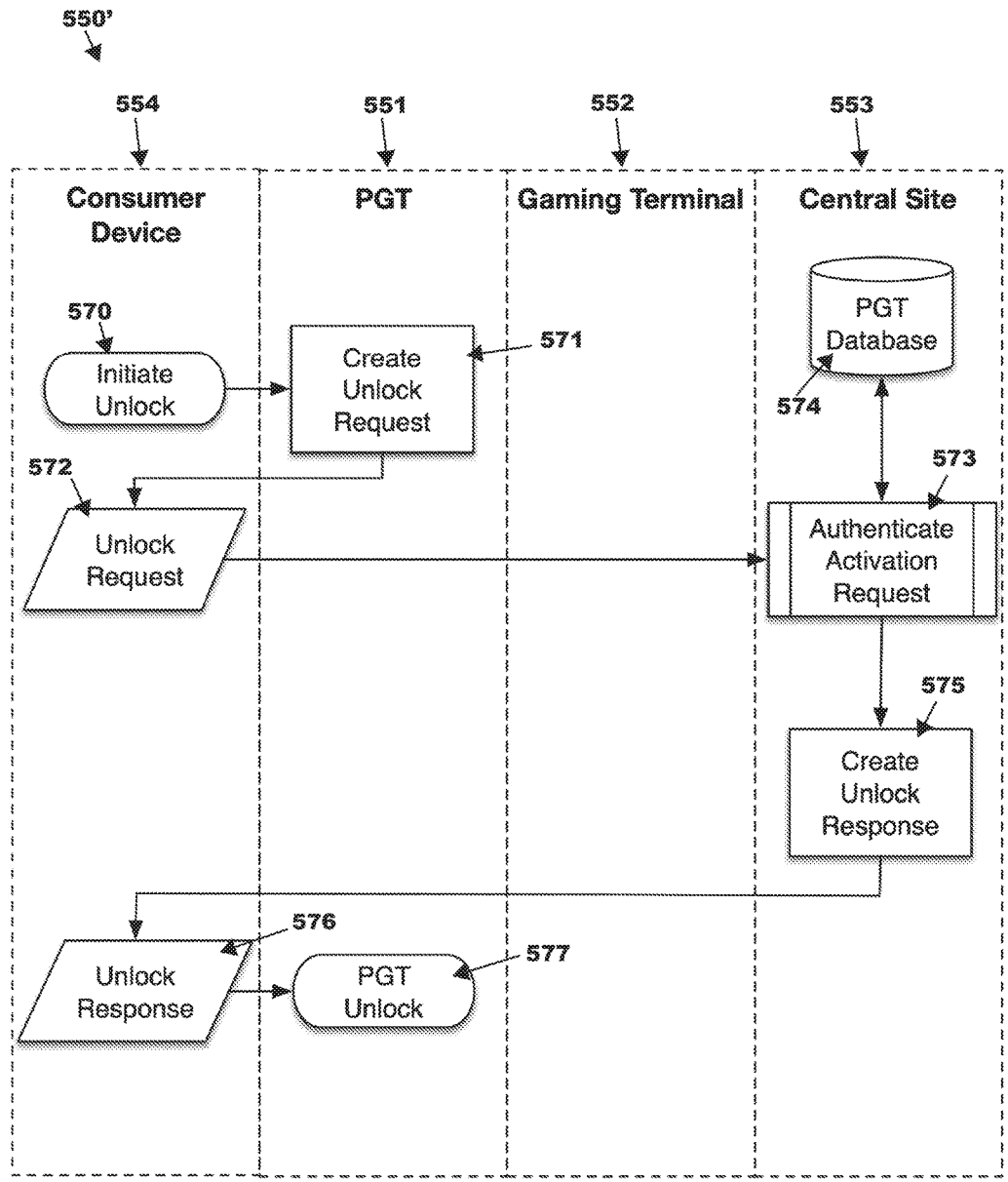
FIG. 5C is a representative example high level architecture swim lane diagram of the key components associated with activating and unlocking PGT devices via a combination of a gaming terminal and a consumer's mobile device in the second stage in accordance with the embodiment of FIGS. 5A and 5B.

FIGS. 5A, 5B, and 5C taken together, illustrate an alternative embodiment 500, 550, and 550' of the invention for the activating and unlocking of the PGT in conjunction with its purchase where the gaming terminal does not include contactless reader capability. However, in this embodiment, the gaming terminal includes one or more of the following readers: barcode, magnetic stripe, and/or QR code which are used in the activation process. FIG. 5A is an overall representative example block diagram of the general embodiment 500 illustrating a PGT 501, gaming terminal 520, central site 530 (also, referred to interchangeably as a "game server"), and consumer device 540. FIG. 5B depicts a "swim lane" flowchart providing a schematic graphical overview 550 of the same embodiment in the first stage of activation. FIG. 5C depicts a second swim lane flowchart providing a schematic graphical overview 550' of the same embodiment in the second stage of activation. As illustrated in FIGS. 5B and 5C, system-level functionality is conceptually divided into four groups (i.e., consumer device 554, PGT 551, gaming terminal 552, and central site 553 (also, referred to interchangeably as a "game server") by the four swim lane columns from left to right. Flowchart functions that appear within a swim lane are limited to the data category of that swim lane.

In this embodiment 500 of FIG. 5A, the PGT 501 is offered for sale in retail and gaming environments where the gaming terminal 520 does not include a contactless reader capability but does include one or more of the following capabilities 521: barcode, magnetic stripe, and/or QR code thus enabling the gaming terminal 520 to digitally identify the PGT 501 via its barcode 502, magnetic stripe 503, or QR code 504. In this embodiment, the gaming terminal 520 also includes a secure data connection 522 to the central site 530.

PGT 501 is presented for sale anywhere in the store or gaming environment within easy reach of the player who brings the PGT 501 to a cashier with a gaming terminal 520 to complete the purchase. Once the purchase is complete, the PGT 501 must undergo an activation and unlock process to be ready it for use. This activation and unlock process requires secure messaging between the PGT microprocessor 510 and central site 530. The lack of a contactless reader in the gaming terminal 520 in this embodiment means that the activation and unlock process cannot be completed by relying on the gaming terminal 520 for communication between the PGT microprocessor 510 and central site 530. In this specific embodiment, the activation and unlock process is split into two flows: one flow involving the PGT 501, gaming terminal 520, and central site 530 to initiate the activation and unlock process, and then a second flow to complete the process involving the PGT 501, consumer device 540, and the central site 530 where the consumer device 540 uses its Wi-Fi or cellular data connection to the Internet 535 to communicate with the central site 530 and then to the PGT 501 via communications circuitry supporting a NFC-enabled contactless communications interface 541.

As shown in system embodiment 500's associated first stage high-level architecture swim lane diagram 550 of FIG. 5B, there are four functional components (i.e., consumer device 554, PGT 551, gaming terminal 552, and central site 553) of the invention residing in separate devices. Swim lane diagram 550 begins with the gaming terminal 552 initiating activation 560 by reading static identity data 561 from the PGT 551. The identity data is embodied in one or more of the following technologies in the PGT: barcode, magnetic stripe, and/or QR code. Depending on which technology is available in the PGT 551 and which technology the gaming terminal 552 supports, the gaming terminal reads the PGT identity data 561 and uses the identity data 561 to create an activation request 562 which can then be sent to the central site 553. The received identity data 561 is formatted by the gaming terminal 552, thereby generating an activation request 562 to be transmitted to the central site 553. Typically, the formatted activation request 562 appends the gaming terminal's own authentication data to the identity data 561 prior to transmitting to the central site 553 through a VPN. For example, the gaming terminal's 552 serial number and/or MAC and transaction counter could be appended to the PGT identity data 561 with the formatted activation request 562 encrypted by the terminal's 552 shared symmetrical key with the central site 553.

When the central site 553 receives the activation request 563, it authenticates 563 the gaming terminal 552 (both the terminal itself as well as checking to determine if the transaction counter is in synchronization) and queries a database 564 to confirm that the identity of the PGT 551 requiring activation is valid. However, in this embodiment, the central site 553 cannot authenticate the PGT micropro-cessor at this time as it was able to do in the previous embodiment of previous embodiment 400 of FIG. 4A. With the current embodiment, since the gaming terminal 552 (FIG. 5A) is securely connected to and trusted by the central site 553, the central site 553 will honor the request for activation so long as the PGT identity data 561 contained within the activation request 562 matches the a priori database 564 of the valid PGT devices in circulation and not previously activated. Once confirmed, the central site 553 creates an activation response 565 that is transmitted 566 to the gaming terminal 552. Additionally, the creation of the activation response 565 also transmits a flag to the PGT database 564 that this particular PGT 551 has been purchased and should be activated upon future request. Returning to the gaming terminal 552, once the activation response is received, the terminal typically prints a paper receipt for the purchase that the cashier hands to the player as well as the now sold PGT. In a special embodiment, the paper receipt 566 can include a human and/or machine readable activation code that can be employed during the second stage of the activation process. In summary, this first stage 550 of the activation process has flagged the PGT 551 as active on the central site 553 database 564, but the PGT 551 microprocessor itself has not been unlocked. Thus, the second stage 550' (FIG. 5C) of the activation process unlocks the PGT 551 microprocessor thereby enabling its use.

With the PGT in hand, the player will typically download to their consumer device, an official mobile application from the gaming provider. To aid the player with this process, the PGT 501 (FIG. 5A) may optionally include a QR code 504 that would direct the mobile device's browser to the appropriate download site (e.g., Apple's App Store®, Google Play®, gaming provider web site). One key role of the mobile application is to serve as a relay for communication between the PGT and central site. In this role, the mobile application includes functionality for communicating with a PGT via the NFC interface of the consumer device and for communicating with the central site via a Wi-Fi or cellular data connection to the Internet.

With the official gaming application on the consumer device 554 (FIG. 5C), the application will instruct the player to hold the PGT 551 in close proximity to the consumer device's 554 NFC reader. When the PGT 551 is in close proximity to the consumer device 554, the consumer device 554 initiates the unlock process 570 by communicating via NFC with the PGT 551 microprocessor. Since the PGT microprocessor has not yet been unlocked, it is only able to respond with a secure unlock request 571 which can only be processed by the central site 553. The format of the secure unlock request 571 can vary, but typically includes the PGT's 551 serial number and/or MAC digitally signed by the device's private key with the public key a priori known to both the central site 553 database 574. Once the unlock request is received 572 by the consumer device 554, the consumer device 554 transmits the unlock request 572 on to the central site 553.

When the central site 553 receives the unlock request, it attempts to authenticate the activation request 573 by querying the database 574 to confirm that the PGT requesting unlock is valid (e.g., digital signature is correct) and has been previously flagged as sold and therefore eligible for activation. Once confirmed, the central site 553 creates an unlock response 575 that includes an unlock code for the PGT 551. The central site 553 then transmits the unlock response 577 to the consumer device 554. Once the consumer device 554 receives the unlock response 577, it then communicates that unlock response 576 to the PGT 551 microprocessor via NFC. When the PGT 551 microprocessor receives the unlock response it validates the authenticity of that response and then applies the included unlock code to unlock 577 the PGT 551 microprocessor. At this point the PGT is fully activated, unlocked and ready for use by the player.

In a preferred embodiment, the activation and unlock process includes some number of play credits applied to the PGT for use in ticket generation as will be described next. The player may also add play credits to the PGT over time via purchases at authorized retailers where the gaming terminal is used to obtain secure play credits from the central site and communicate them to the PGT. Alternatively, play credits may be purchased via e-commerce transactions as will be described further on. In yet another alternative embodiment, play credits accumulated from previous wins can be applied to purchasing additional draw game wagers in the PGT. Finally, it is also possible that the PGT does not include a facility for storing play credits and is only used to securely generate and store tickets.

With the PGT fully activated, unlocked, and in the possession of the player, use of the PGT by the player to securely generate draw game tickets will now be disclosed. The following description assumes that some play credits are available for use by the PGT.

Figure 6A:
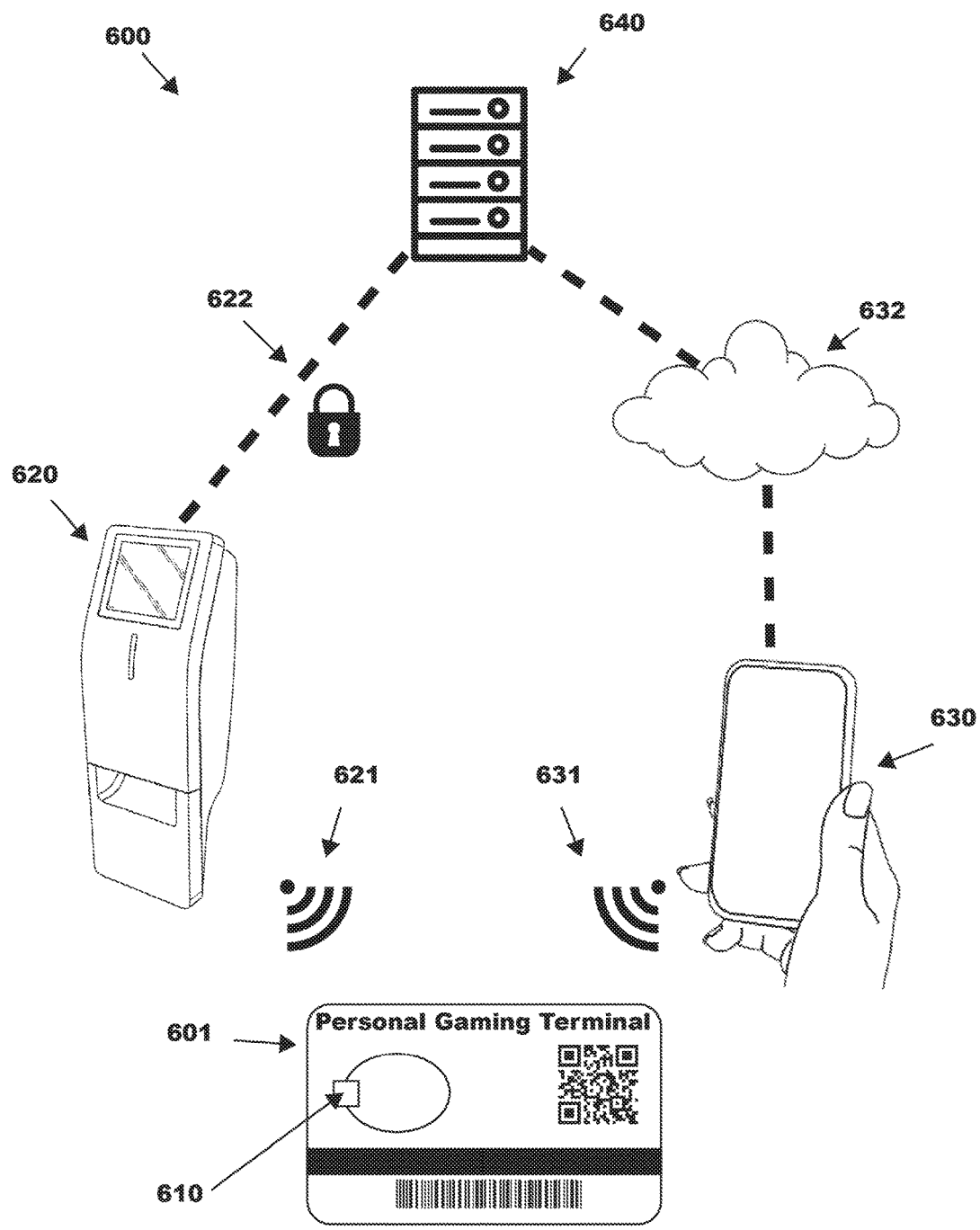
FIG. 6A is a block diagram providing a schematic graphical overview of a general embodiment system for the PGT generating bet tickets on behalf of the player and registering those tickets via gaming terminals, kiosks, or via the player's mobile phone.
Figure 6B:
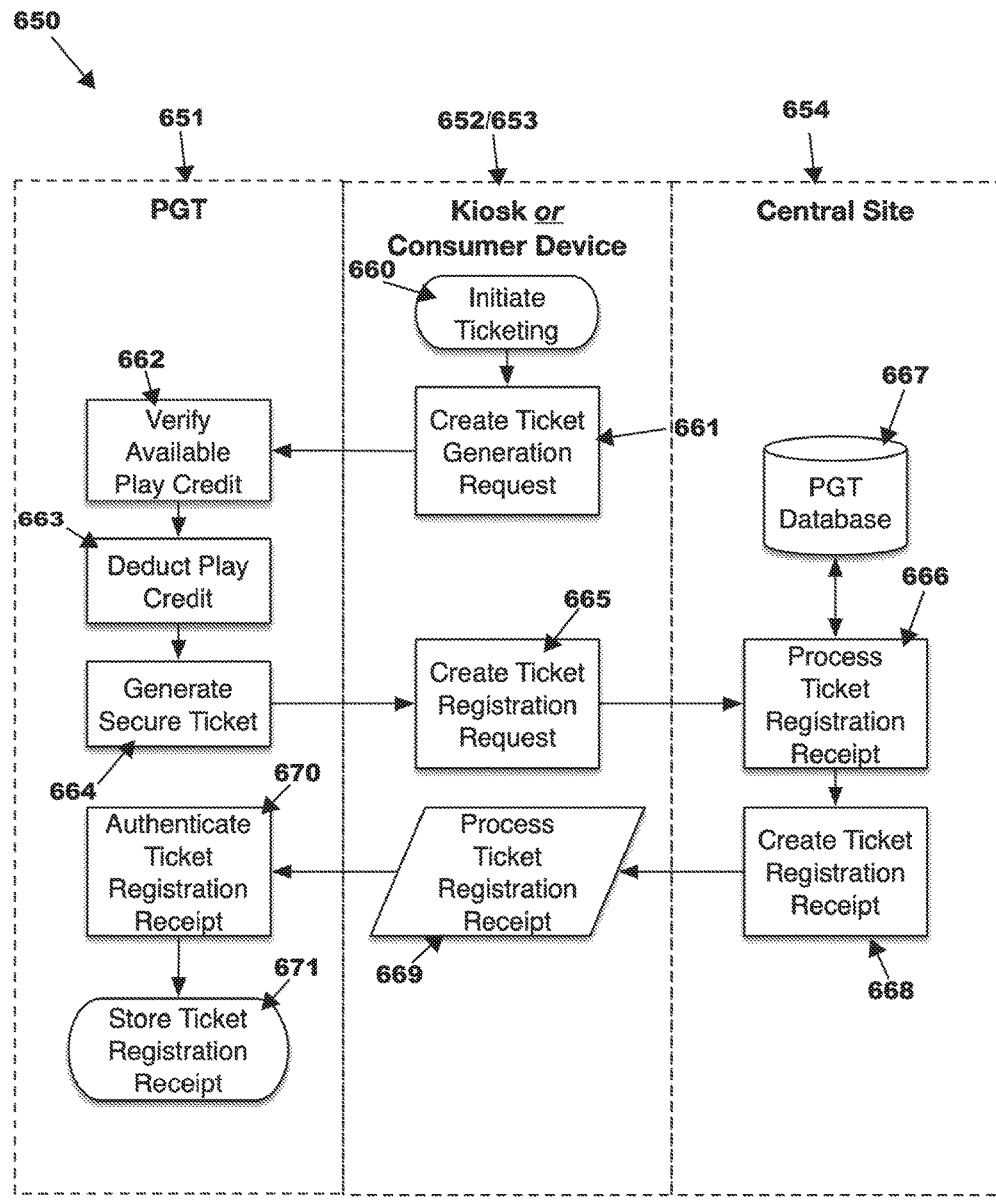
FIG. 6B is a representative example high level architecture swim lane diagram of the key components associated with PGT ticket generation in accordance with the embodiment of FIG. 5A.

FIGS. 6A and 6B taken together, illustrate a general embodiment 600 and 650 of the invention for the generation of draw game tickets by the PGT and communication of those tickets to the central site via a gaming kiosk or consumer device. FIG. 6A is an overall representative example block diagram of the general embodiment 600 illustrating PGT 601, a gaming kiosk 620 that includes a contactless reader 621, a consumer device 630 that includes NFC contactless capability 631, and a gaming central site 640 (also, referred to interchangeably as a "game server"). FIG. 6B depicts a "swim lane" flowchart providing a schematic graphical overview 650 of the same embodiment. As illustrated in FIG. 6B, system-level functionality is conceptually divided into three groups (i.e., PGT 651, gaming kiosk 652 or consumer device 653, and central site 654 (also, referred to interchangeably as a "game server") by the three swim lane columns from left to right. Because the functionality and flows involving a gaming kiosk and consumer device are similar in this embodiment, they have been combined in a single swim lane in FIG. 6B. Flowchart functions that appear within a swim lane are limited to the data category of that swim lane.

In the embodiment 600 of FIG. 6A, the PGT 601 microprocessor 610 has been previously activated and unlocked. The player now desires to use the PGT 601 to generate draw game tickets that can be entered into an upcoming drawing. This ticket generation process requires secure messaging between the PGT 601 microprocessor 610 and central site 640. As illustrated in FIG. 6A, messaging between the PGT microprocessor 610 and central site 640 flows through the gaming kiosk 620 or consumer device 630.

If the player has access to a retail location where the game provider offers self-service devices such as a gaming kiosk 620 outfitted with contactless reader capability 621, then the player can use his or her PGT 601 to place a draw game wager via the gaming kiosk 620. As illustrated in FIG. 6A, the gaming kiosk 620 includes a secure data connection 622 (e.g., VPN) to the central site 640. The player interacts with the gaming kiosk 620 to place a draw game wager (e.g., numbers selection, horse race outcome, quick pick, over/under) for a future drawing. The gaming kiosk 620 then uses its contactless communication capability 621 to communicate with the PGT microprocessor 610 to log the initial draw game wager and request that a virtual bet ticket be generated and returned to the gaming kiosk 620 from the central site 640. Once the generated virtual ticket is returned from the central site 640 to the gaming kiosk 620, the gaming kiosk 620 submits the ticket to the PGT microprocessor 610 non-volatile memory (e.g., EEPROM) such that the PGT will retain the wager data locally thereby functioning as a bearer document assuming the draw game wager culminates in a win.

A similar process is shown in this embodiment involving a consumer device 630 instead of a gaming kiosk 620. For the consumer device 630, the player interacts with a mobile application typically provided by the gaming authority on his or her personal consumer device 630 to make a draw game wager. The NFC capability 631 of the consumer device 630 enables communication with the PGT microprocessor 610. The consumer device 630 is connected to the central site 640 via a Wi-Fi or cellular data connection via the Internet 632. The consumer device 630 submits the draw game wager request produced by the PGT microprocessor 610 to the central site 640 for subsequent generation of a virtual ticket, relaying of the virtual ticket back to the PGT for storage locally for the desired draw game drawing.

As shown in system embodiment 600's associated high-level architecture swim lane diagram 650 of FIG. 6B, there are three functional components (i.e., PGT 651, gaming kiosk 652 or consumer device 653, and central site 654) of the invention residing in separate devices. The specific flow involving the gaming kiosk 652 will now be described. Swim lane diagram 650 begins with the gaming kiosk 652 initiating draw game ticketing 660 by presenting an interactive application on the gaming kiosk 652 screen for the player to decide which draw game wager to enter and what type of draw game ticket is desired for that drawing. Once the player has made his selections the gaming kiosk 652 creates a virtual ticket generation request 661 to send to the PGT 651 microprocessor.

The player is instructed to hold his or her PGT in close proximity to the contactless reader of the gaming kiosk 652. When the PGT 651 is in close proximity to the contactless reader of the gaming kiosk 652, the gaming kiosk 652 communicates the virtual ticket generation request 661 to the PGT 651 microprocessor. Once the PGT 651 microprocessor receives the ticket generation request, the PGT 651 microprocessor verifies that there are play or game credits available 662 within the microprocessor to generate a new virtual draw game bet at an a priori predefined cost for the desired wager (e.g., PowerBall® wager of $2, Pick 3 wager of $1, horse race trifecta wager at posted odds and consumer selected amount above minimum, football over/under wager at posted odds and consumer selected amount above minimum). With sufficient play credits available, the PGT 651 microprocessor deducts a play credit 663 equivalent to the predefined cost for the desired wager and then using its ticket engine generates a secure ticket 664 that matches the player's request with the details of the player's wager included in the pending ticket generation request and logged in the PGT. In addition to the pending wager information, the secure ticket 664 or message also includes an identification number (e.g., serial number, MAC address) unique to each microprocessor as well as at least a portion of the ticket message encrypted or cryptographically signed by the microprocessor's unique cryptographic key.

With specific embodiments where the player has requested a quick pick style ticket for a lotto style draw game, the PGT may use its ticket engine and underlying random number generating capabilities to randomly select numbers for the player and locally log those numbers, incorporating the same numbers into the pending virtual ticket request. In an alternative embodiment, the lotto quick pick functionality may be included in the application in the gaming kiosk 652 in which case the application in the gaming kiosk 652 will use its own random number generator to select numbers and provide the quick pick lotto numbers to the PGT 651.

Once the PGT 651 microprocessor has generated a secure virtual ticket 664 request, the secure ticket request is communicated back to the gaming kiosk 652 via the contactless reader. The gaming kiosk 652 then creates a ticket registration request 665 for the central site 654. This request includes the secure virtual ticket request generated by the PGT 651. Once the central site 654 receives the ticket registration request, it processes the request 666, typically querying its PGT database 667, to verify that an authentic PGT 651 microprocessor has generated a secure virtual ticket request. As previously described, this authentication relies on cryptography and principals of end-to-end security between the portable microprocessor embedded in the PGT 651 and the central site 654 with the portable microprocessor's unique identification number used to direct the authentication and integrity checks of the portable microprocessor's cryptographically signed message (also, referred to as a "first cryptographically signed message") with the central site's 654 PGT database 667. With the secure ticket request validated and accepted and logged at the central site 654, the central site 654 then creates a virtual ticket registration receipt 668 to confirm acceptance of the secure ticket request into the requested drawing. This ticket registration receipt 668 is formatted as a cryptographically signed message (also, referred to as a "second cryptographically signed message") that was generated using the unique cryptographic key associated with the portable microprocessor's unique identification number.

The central site 654 returns the virtual ticket registration receipt 668 to the kiosk 652 or consumer mobile device 653 which then presents the virtual ticket registration receipt 669 to the player and stores the virtual ticket registration receipt in the microprocessor of the PGT 651. To store the receipt, the gaming kiosk 652 communicates the virtual ticket registration receipt to the PGT 651 via the contactless reader of the gaming kiosk 652. Once the PGT 651 microprocessor receives the virtual ticket registration receipt, it verifies and authenticates the virtual ticket registration receipt 670 by ensuring the received cryptographically signed message was generated with the a priori key known to both the PGT 651 and the central site 654. Once the ticket registration receipt is authenticated it is stored 671 in the PGT 651 microprocessor such that the PGT can function as a bearer document in the pending drawing.

Of course, as is apparent to one skilled in the art, there are other embodiments than the preferred embodiment where the virtual ticket registration receipt is stored in the PGT 651 microprocessor, where the virtual ticket registration receipt is not stored in the PGT 651 microprocessor. In these alternative embodiments, the virtual ticket registration receipt could be stored in the consumer device's 653 memory, embodied as a paper receipt printed by the kiosk 652, etc. All of these alternative embodiments having the advantage of a simplified communications interface with the disadvantage of typically lower security.

The flow in FIG. 6B involving the consumer device 653 as the communications interface between the PGT 651 microprocessor and the central site 654 is similar to that just described involving the gaming kiosk 652. The differences for the flow involving the consumer device 653 are as follows:

(1) the consumer device 653 runs the application (e.g., an official mobile application provided by the gaming authority) that the player interacts with to make a draw game wager.

(2) The NFC capability of the consumer device 653 enables communication with the PGT 651.

(3) The connection between the consumer device 653 and the central site 654 is the Internet and is accessed via the Wi-Fi or cellular data capabilities of the consumer device 653. Aside from these implementation differences, the flow and steps to generate and deliver a secure ticket from the PGT 651 microprocessor to the central site 654 are the same as described for the gaming kiosk 620 of FIG. 6A.

Figure 7A:
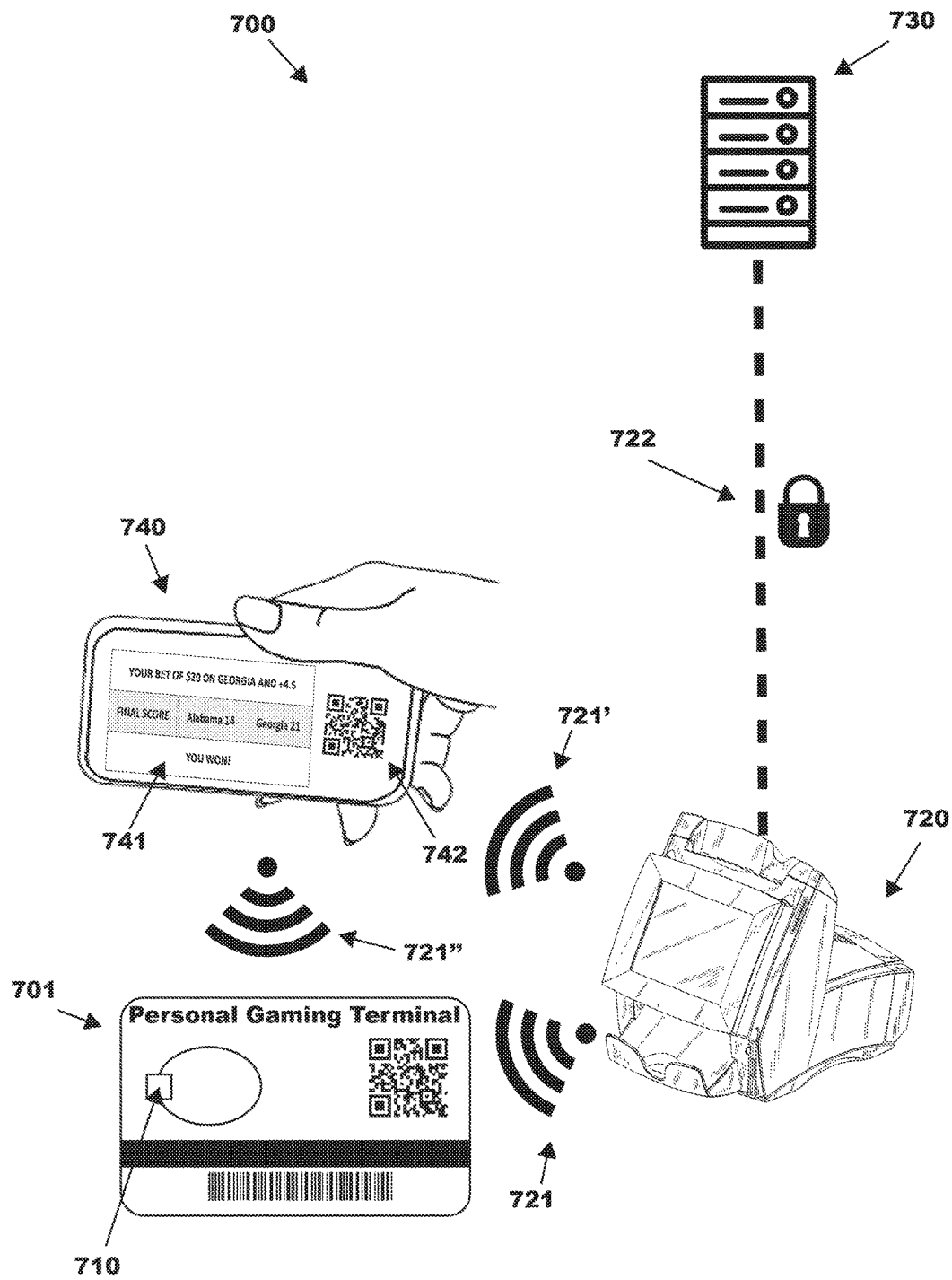
FIG. 7A is a block diagram providing a schematic graphical overview of a general embodiment system for ticket validation by an existing gaming terminal of tickets generated by a PGT to confirm or deny the winning of a prize.
Figure 7B:
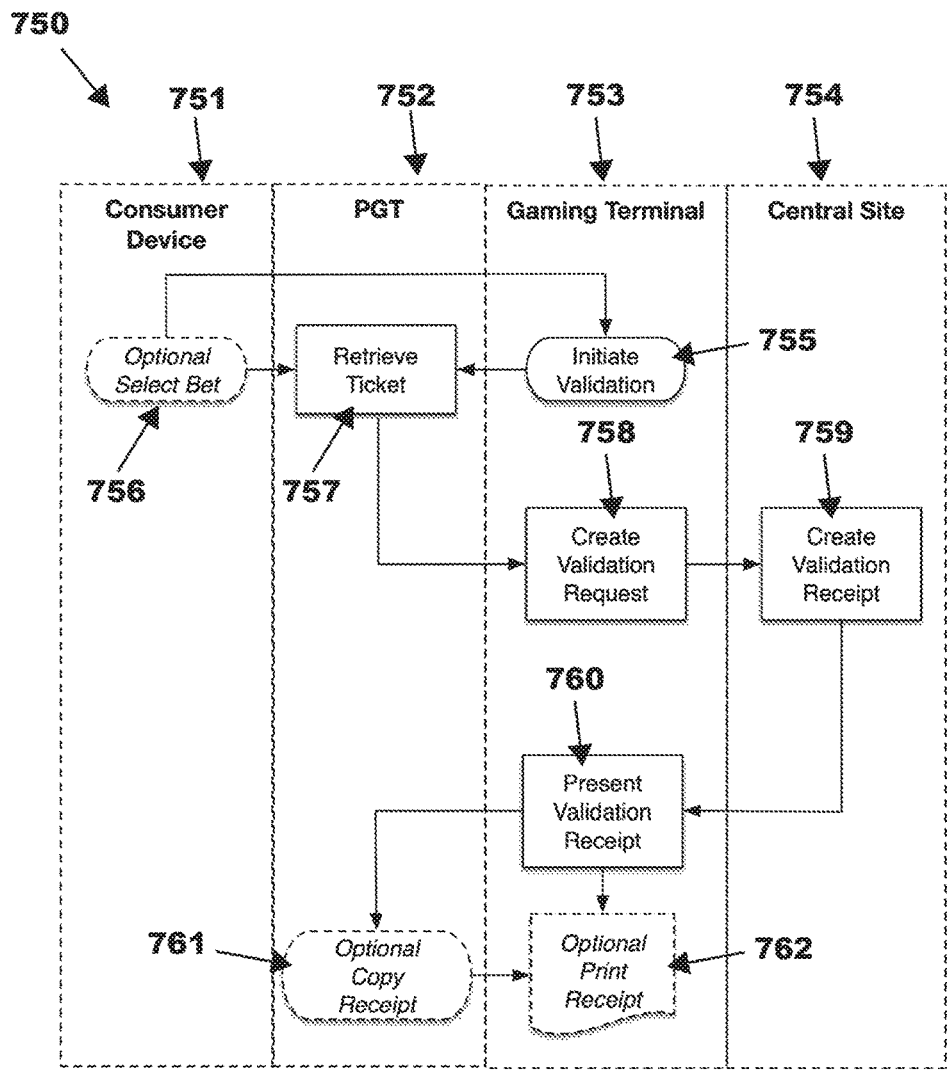
FIG. 7B is a representative example high level architecture swim lane diagram of the key components associated with PGT ticket validation in accordance with the embodiment of FIG. 7A.

FIGS. 7A and 7B taken together, illustrate a general embodiment 700 and 750 of the invention for the validation of winning draw game tickets generated by the PGT. This ticket validation process requires secure messaging between the PGT microprocessor 710 and central site 730 (also, referred to interchangeably as a "game server"). FIG. 7A is an overall representative example block diagram of the general embodiment 700 illustrating a PGT 701, a gaming terminal 720, a central site 730, and an optional consumer device 740. The gaming terminal 720 includes contactless reader capability 721 that enables it to communicate with the PGT microprocessor 710. The gaming terminal 720 also includes a secure data connection 722 to the central site 730. FIG. 7B depicts a "swim lane" flowchart providing a schematic graphical overview 750 of the same embodiment. As illustrated in FIG. 7B, system-level functionality is conceptually divided into four groups (i.e., consumer device 751, PGT 752, gaming terminal 753, and central site 754 (also, referred to interchangeably as a "game server") by the four swim lane columns. Flowchart functions that appear within a swim lane are limited to the data category of that swim lane.

Figure 7C:
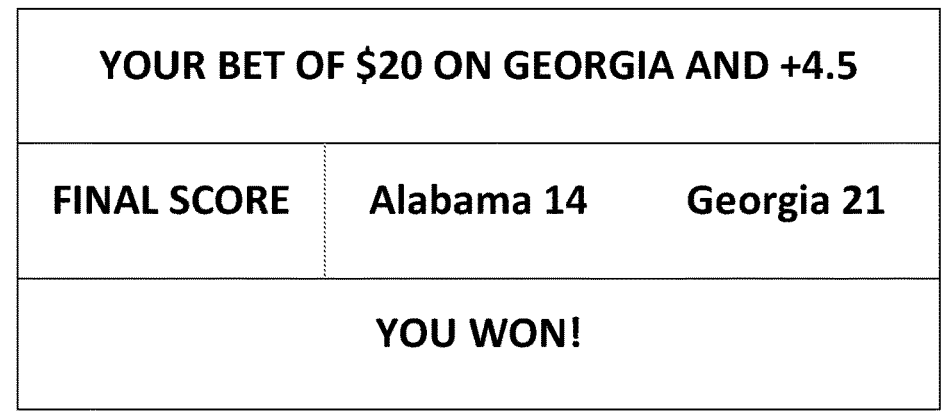
FIG. 7C is a magnified view of the representative example screen 741 of FIG. 7A.

In the embodiment 700 illustrated in FIG. 7A, the player believes he has won a prize from a drawing with one of the tickets embodied within the PGT microprocessor 710. In order to claim the prize, the player visits an authorized gaming retailer that has a gaming terminal 720. In this embodiment, the gaming terminal 720 must also have a contactless reader capability 721 to be able to communicate with the PGT microprocessor 710. The player presents his PGT 701 to the cashier, typically telling the cashier which draw game he or she believes they have won assuming more than one draw game wager is stored on the PGT 701. To assist the player in managing multiple draw game wagers, the player's consumer device 740 can optionally display all active and closed wagers embodied in the PGT 701 with their associated statuses 741—also illustrated magnified in FIG. 7C. As a specific option, the player's consumer device 740 may also communicate directly with the gaming terminal 720 (e.g., NFC 721', Bluetooth, QR code 742) to assist in identifying the potentially winning wager. Alternatively, the player's consumer device 740 may communicate directly (via NFC 721") with the PGT 701 to ensure that the PGT 701 only transmits the draw game wager of interest in the subsequent transaction with the gaming terminal 720.

After the potentially winning draw game wager has been identified, the cashier initiates the validation process by interacting with the gaming terminal 720 and then placing the PGT 701 in the working proximity of the contactless reader 721 of the gaming terminal 720. The contactless reader of the gaming terminal 720 communicates 721 with the PGT microprocessor 710 to retrieve the ticket for the specified drawing. Once the ticket is received by the gaming terminal 720, the terminal 720 uploads the ticket's digital information 722 to the central site 730 for validation. If the ticket is valid and corresponds to a win, the central site 730 transmits a payment authorization to the gaming terminal 720 and the player is paid their winnings.

As shown in system embodiment 700's associated high-level architecture swim lane diagram 750 of FIG. 7B, there are four functional components (i.e., consumer device 751, PGT 752, gaming terminal 753, and central site 754) of the invention residing in separate devices. Swim lane diagram 750 begins with the gaming terminal 753 initiating validation 755 by powering up its contactless reader. Optionally, the pending wager ticket to be validated may first be identified by the consumer device 756 with the identified wager flagged and then either transmitted to the gaming terminal 753 or the PGT 752.

With either start of the process the cashier places the PGT 752 in working proximity of the contactless reader of the gaming terminal 753. With the PGT 752 in close proximity to the contactless reader of the gaming terminal 753, the gaming terminal communicates with the microprocessor of the PGT 752 to retrieve the digital information of the secure ticket 757 to be validated. Once the gaming terminal 753 has received the secure ticket 757 from the PGT 752 microprocessor, the gaming terminal 753 creates a validation request 758 with the information secure ticket. The gaming terminal 753 then sends the validation request 758 to the central site 754. Once the central site 754 receives the validation request, it attempts to authenticate the secure virtual ticket is valid (i.e., was been previously entered in the drawing) and if the virtual ticket is a winner. Assuming the virtual ticket is valid and a winner, the central site 754 creates a validation receipt 759, forwarding the validation receipt 759 to the gaming terminal 753 authorizing payment of the draw game prize. When the gaming terminal 753 receives the validation receipt 760 the player is paid the appropriate winnings with an optional paper receipt 762 embodiment printed. In a preferred optional embodiment, the validation receipt is also digitally copied to the PGT 752 via the gaming terminal's 753 contactless interface.

Figure 8A:
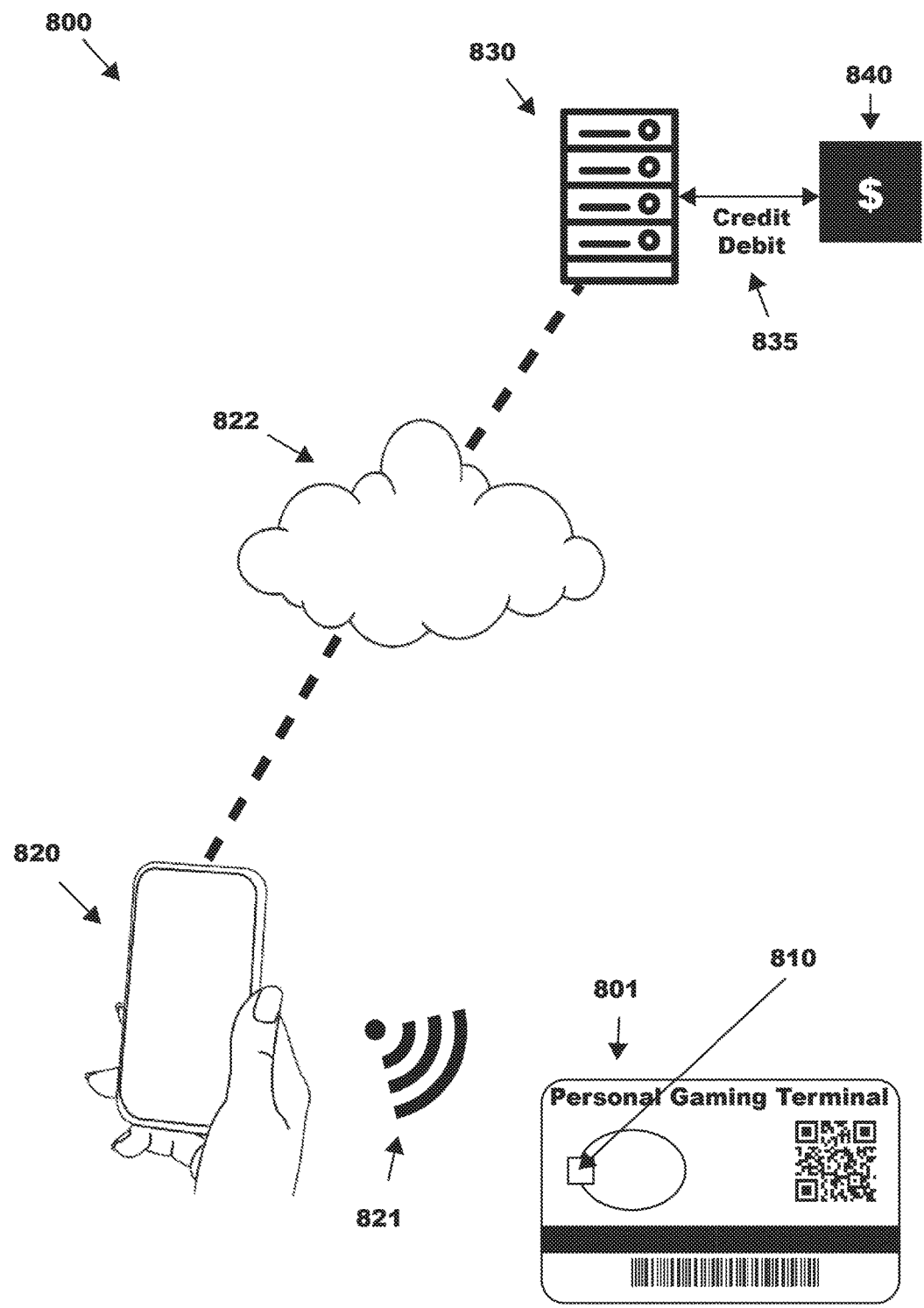
FIG. 8A is a block diagram providing a schematic graphical overview of a general embodiment system for the reloading of PGT play credit and the cashing out of winning tickets in a PGT, both involving e-commerce payment services.
Figure 8B:
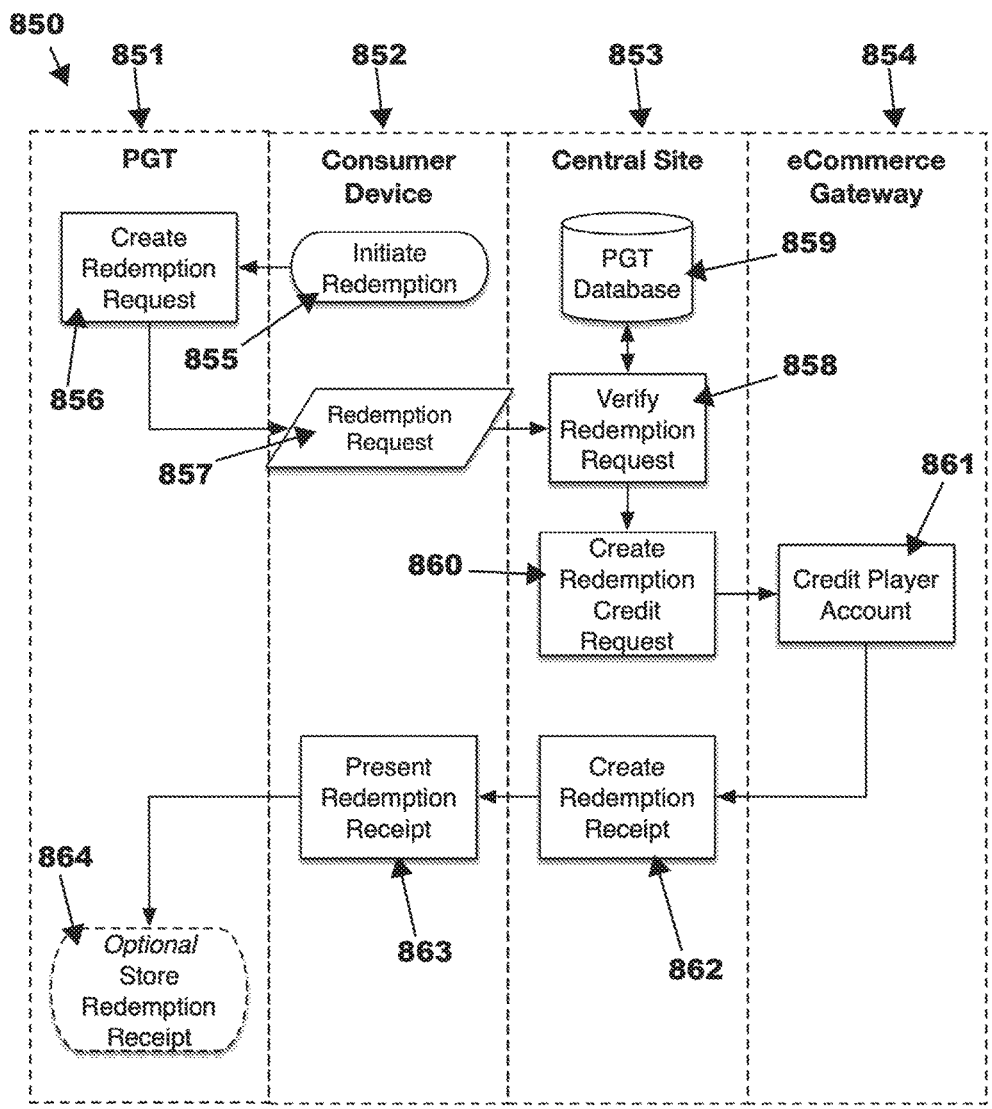
FIG. 8B is a representative example high level architecture swim lane diagram of the key components associated with an e-commerce-based redemption of a winning ticket in a PGT in accordance with FIG. 8A.
Figure 8C:
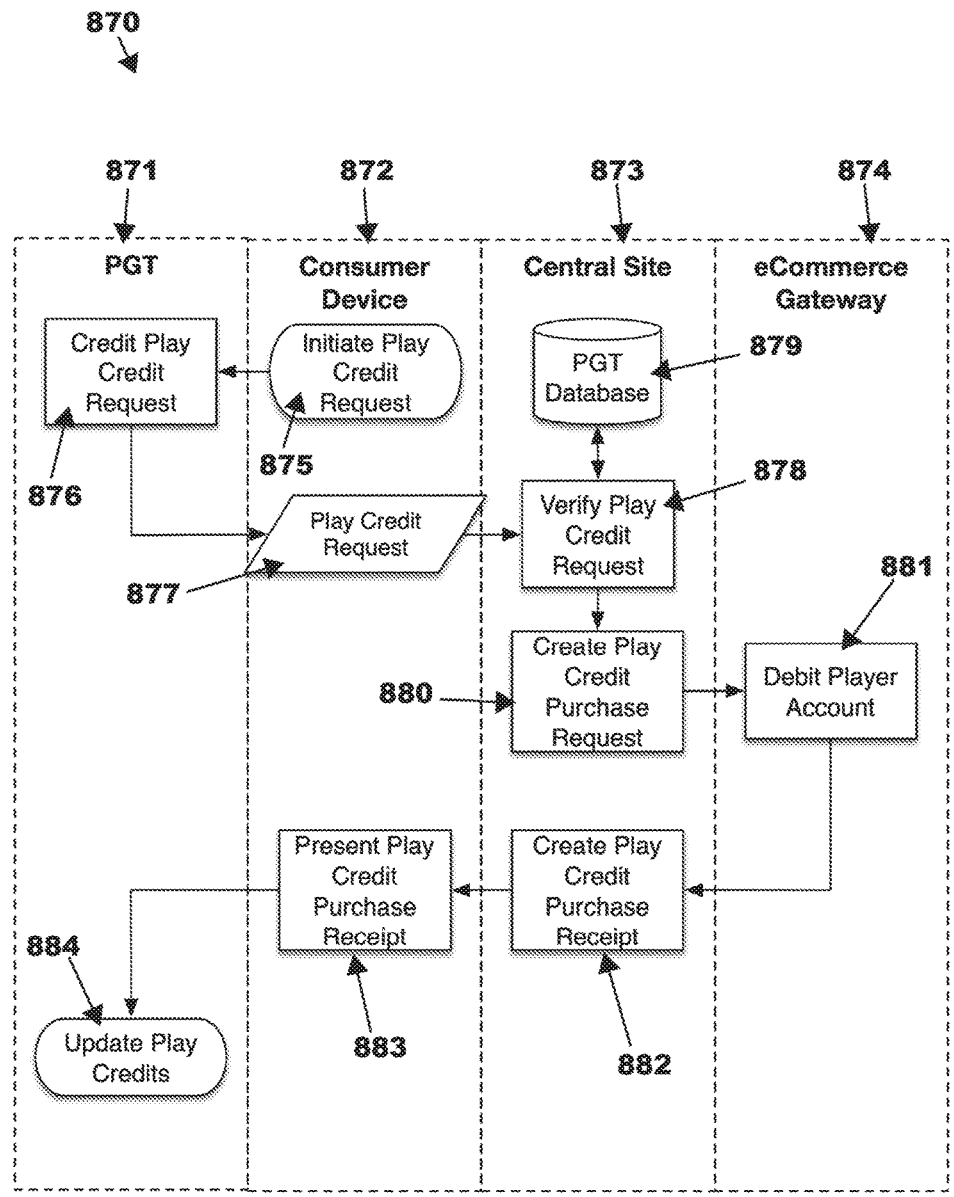
FIG. 8C is a representative example high level architecture swim lane diagram of the key components associated with the reloading of PGT play credit via an e-commerce purchase in accordance with FIG. 8A.

Some lotteries may allow players to perform prize redemptions or reloading of play credits via e-commerce style transactions. This embodiment will now be disclosed. FIGS. 8A, 8B, and 8C taken together, illustrate a general embodiment 800, 850, and 870 (respectively) of the invention for the redemption of prizes and reloading of play credits via e-commerce style transactions. In this embodiment these transactions are all performed via secure messaging between the PGT and central site that flows through the consumer's device. These transactions can take place anywhere allowed by the gaming authority—for example at the home of the player.

FIG. 8A is an overall representative example block diagram of the general embodiment 800 illustrating a PGT 801 and its microprocessor 810, a consumer device 820, a central site 830 (also, referred to interchangeably as a "game server"), and an e-commerce gateway 840. The consumer device 820 includes NFC capability 821 that enables communication with the PGT microprocessor 810. The consumer device 820 also includes a Wi-Fi or cellular data Internet connection 822 to communicate with the central site 830. FIGS. 8B and 8C depict "swim lane" flowcharts providing schematic graphical overviews 850 and 870 of the same embodiments. As illustrated in FIGS. 8B and 8C, system-level functionality is conceptually divided into four groups (i.e., PGT 851/871, consumer device 852/872, central site 853/873 (also, referred to interchangeably as a "game server"), and e-commerce gateway 854/874) by the four swim lane columns from left to right. Flowchart functions that appear within a swim lane are limited to the data category of that swim lane.

In one general embodiment 800 of FIG. 8A, the player believes a winning prize virtual ticket is contained within PGT microprocessor 810. In this general embodiment, the gaming authority offers an option to automatically load prize money directly into a bank checking or debit card account owned by the player, rather than requiring the player to visit an authorized retailer in person to receive cash. The process typically involves an official mobile application provided by the gaming authority on the consumer's device 820. To begin the redemption process, the mobile application instructs the player to hold the PGT 801 in close proximity to the consumer device 820. The consumer device communicates via its NFC capability 821 with the PGT microprocessor 810 to generate a secure redemption request that is then returned to the consumer device 820 and forwarded on via the Wi-Fi or cellular data Internet connection 822 to the central site 830. The central site 830 validates the request and then using an e-commerce gateway service 840, where the player has previously registered his bank account or debit card, the central site initiates a credit 835 of the prize money to the player's account. This embodiment will now be further described via FIG. 8B.

As shown in system embodiment 800's associated high-level architecture swim lane diagram 850 of FIG. 8B, there are four functional components (i.e., PGT 851, consumer device 852, central site 853, and e-commerce gateway 854) of the invention residing in separate devices. Swim lane diagram 850 begins with the consumer using an official mobile application from the gaming authority on consumer device 852 to initiate prize redemption 855. The player is instructed to hold the PGT 851 in close proximity to the NFC reader of the consumer device 852. When the PGT 851 is in close proximity to the consumer device 852, the consumer device 852 communicates via NFC with the PGT 851 microprocessor to initiate the redemption. The PGT 851 then creates a secure redemption request 856 that includes the winning ticket information, sending it to the consumer device 852.

Once the redemption request 857 is received by the consumer device, it forwards the redemption request 857 to the central site 853 via the consumer device's 852 Wi-Fi or cellular data Internet connection. When the central site 853 receives the redemption request, it verifies the authenticity of the request 858 to confirm that it was created by an authentic PGT 851 as maintained in its database 859. The central site 853 also verifies that the ticket included in the redemption request is valid and corresponds to a win. Once confirmed, the central site 853 then creates a redemption credit request 860 to credit the funds for the prize to a bank or debit account that was previously registered by the player. The central site 853 sends the redemption credit request 860 to the e-commerce gateway 854 that accepts and reviews the request. The e-commerce gateway then applies the appropriate credit to the player's account 861 and sends a confirmation back to the central site 853. The central site 853 then creates a redemption receipt 862 and returns it to the consumer device 852. The redemption receipt is typically presented to the consumer via the mobile application 863 in the consumer device 852 to confirm for the player that the prize has been paid out to the player's account. As an option, the player may elect to store the receipt 864 on the PGT microprocessor 851. To do so, the player must hold his PGT 851 in proximity to the NFC reader of the consumer device 852 and the consumer device 852 will then transfer the redemption receipt to the PGT 851 that stores the redemption receipt 864 in its microprocessor's non-volatile memory.

In a specific embodiment the player may effectively pay for additional play credits in the PGT without having to return to an authorized gaming retailer and pay cash. This specific embodiment process typically involves an official mobile application provided by the gaming authority to be resident on the consumer's device 820—see FIG. 8A. To begin the process, the mobile application instructs the player to hold the PGT 801 in close proximity to the consumer device 820. The consumer device 820 communicates via its NFC capability 821 with the PGT microprocessor 810 to create a secure play credit request that is then returned to the consumer device 820 and forwarded on via a Wi-Fi or cellular data Internet connection 822 to the central site 830. The central site 830 validates the request and then using an e-commerce gateway service 840 where the player has previously registered his bank account or debit card, the central site 830 is able to debit 835 the player's account for the purchase. The central site 830 is then able to create a secure play credit purchase receipt that can be returned to the PGT microprocessor 810 via the consumer device 820 and its NFC capability 821. Once the purchase receipt is received, the PGT microprocessor 810 is able to validate its authenticity and then apply the new play credits to the PGT microprocessor 810.

This embodiment will now be further described via FIG. 8C. As shown in system embodiment 800's associated high-level architecture swim lane diagram 870 of FIG. 8C, there are four functional components (i.e., PGT 871, consumer device 872, central site 873, and e-commerce gateway 874) of the invention residing in separate devices. Swim lane diagram 870 begins with the consumer using an official mobile application from the gaming authority on the consumer device 872 to initiate a request for additional play credits 875. The consumer will typically indicate how many additional play credits are desired to be purchased. Once the purchase amount has been set, the player is instructed to hold the PGT 871 in close proximity to the NFC reader of the consumer device 872. When the PGT 871 is in close proximity to the consumer device 872, the consumer device 872 communicates via NFC with the PGT 871 microprocessor to initiate the play credit request. The PGT 871 microprocessor then creates a secure play credit request 876 that includes the requested play credit amount and transfers it to the consumer device 872. Once the play credit request 877 is received by the consumer device 872, it sends the play credit request 877 to the central site 873 via the consumer device's 872 Wi-Fi or cellular data Internet connection. When the central site 873 receives the secure play credit request, it verifies 878 the authenticity of the request to confirm that it was created by an authentic PGT 871 as maintained on its database 879. Once confirmed, the central site 873 then creates a play credit purchase request 880 to debit the required funds from a bank or debit account that was previously registered by the player. The central site 873 sends the play credit purchase request 880 to the e-commerce gateway 874 that accepts and reviews the request. The e-commerce 874 gateway then applies the appropriate debit to the player's account 881 and sends a confirmation back to the central site 873. The central site 873 then creates a secure play credit purchase receipt 882 and returns it to the consumer device 872. The play credit purchase receipt is typically presented to the consumer 883 via the mobile application in the consumer device 882. The player is then instructed to hold the PGT 871 in proximity to the NFC reader of the consumer device 872. The consumer device 872 then transfers the secure play credit purchase receipt to the PGT 871. Once received, the PGT 871 microprocessor authenticates the play credit purchase receipt and once it has confirmed its authenticity, applies the new play credit 884 to the PGT 871 microprocessor.

As will be obvious to anyone skill in the art, the aforementioned play credit reload process could also be accomplished in an authorized retail location where the player presents the PGT to the cashier along with cash for the additional play credit purchase. The cashier would then complete the credit reload process via the gaming terminal and central site with no need to engage an e-commerce gateway.

In another alternative embodiment, a gaming authority may allow small dollar value prize redemptions to be automatically converted to play credits via the central site 830 (FIG. 8A) without the need to engage the e-commerce gateway.

In an alternative embodiment of the PGT itself, a gaming authority may choose to create a PGT that also includes standard debit card functionality such as Visa® or MasterCard® EMV (Europay, MasterCard, and Visa) applications in the PGT microprocessor. In such a case, the debit account associated with EMV application in the chip of the PGT could be automatically configured to receive prize redemptions and also be used as the source of funds for play credit purchases.

While these disclosures have focused on embodiments of the PGT where the microprocessor includes a contactless capability, as is apparent to one skilled in the art, there are various alternative interface embodiments that may under some circumstances be more desirable. For example, one possible alternative embodiment could utilize an ISO/IEC 7816 "contact" interface to the microprocessor similar to EMV credit and debit cards that are inserted into payment terminals to complete a transaction. In this exemplary alternative embodiment, the inclusion of a contact interface may be beneficial as the sole communications interface to the PGT or as an added communications interface to be combined with contactless communications in the same microprocessor. The contact interface may be preferable in some gaming kiosk environments where the play inserts the PGT into an ISO/IEC 7816 compatible card reader to affect all communication between the PGT and gaming kiosk.

Program code (computer code or software code) is used for implementing certain features of the present invention. First, there is program code executable within the portable microprocessor (PGT microprocessor) configured to perform at least the following functions:

1. Compare the cost of a requested wager to the available game credits.

2. Approve the requested wager when the available game credits are sufficient to cover the wager cost.

3. Deduct the wager cost from the available game credits.

4. Create a first cryptographically signed message using the unique cryptographic key.

5. Authenticate the second cryptographically signed message

6. Store the authenticated ticket or receipt in the memory of the portable microprocessor.

Second, there is application software program code executable within each of the respective mobile devices or game terminals. The application software program code is configured to perform at least the following functions:

1. Allow the consumer to request to make a wager on the draw game by entering wager data into the mobile device or the game terminal.

2. Communicate with one of the portable microprocessors via the communication interfaces of the mobile device or the game terminal, and the portable microprocessor.

3. Communicate with the game server via the communication circuitry of the mobile device or the game terminal to relay the first cryptographically signed message from the portable microprocessor to the game server.

4. Relay the second cryptographically signed message from the game server to the portable microprocessor.

Third, there is program code executable within the game server configured to perform at least the following functions:

1. Authenticate the first cryptographically signed message received from one of the mobile devices or game terminals.

2. Accept for game play the wager in the first cryptographically signed message upon authentication.

3. Generate the second cryptographically signed message that includes the ticket or receipt for a wager that was made by the consumer on the game and which was accepted by the game server.

4. Communicate the second cryptographically signed message to the mobile device or the game terminal that sent the first cryptographically signed message The program code is executable within a processor of the respective elements, here, the portable microprocessor, mobile device and/or game terminal, and game server. The program code is stored on computer readable storage media within the respective elements. The program code may be written using any suitable programming languages and/or programming or scripting tools, and also may be compiled as executable machine language code or intermediate code that is executed on a framework or virtual machine.

SAMPLE USE CASE: Lottery Draw Game (e.g., Powerball)

1. Consumer goes to a retail establishment to purchase a PGT (portable microprocessor) with some amount of play credit loaded into the PGT. The PGT has the form factor of a plastic card as described above.

2. The purchase is made and as a result of the purchase, the central gaming server is notified that a specific PGT is now activated and the dollar amount of credit for that PGT is also recorded. This happens by communicating the serial number (and ideally a cryptographically signed message from the microprocessor) back to the central gaming server along with the purchase amount.

3. Consumer downloads a mobile application to their mobile phone that communicates (via Application Program Interfaces or "APIs") with the microprocessor via NFC.

4. Using the mobile application, the consumer reads the card to see how much credit is available on the card.

5. Using the mobile application, the consumer queries the central gaming server to determine when the next drawing will be held to decide if he or she wants to place a wager.

6. Using the mobile application, the consumer selects his or her numbers for the upcoming draw.

7. The mobile application then instructs the consumer to hold the PGT card to the mobile phone so that the requested wager and numbers can be communicated to the card.

8. The PGT card then makes a determination that the available credit exists to make the wager, debits the available credit, and creates a cryptographically signed message containing a card serial number to identity the card and all wager information that the central gaming server will be able to authenticate in order to accept the proposed wager.

9. This message is sent from the PGT card back to the mobile app via NFC.

10. The mobile app then sends the message via Wi-Fi or cellular data to the central gaming server.

11. The central gaming server receives the message and attempts to authenticate it based on the PGT identity asserted in the message and by doing a look-up in the central gaming server database to confirm: (a) that the PGT has been previously purchased and activated (i.e., not stolen), (b) that the signature on the message can be cryptographically authenticated using keys in the central gaming server that correspond with keys associated with the individual PGT.

12. Once authenticated, the central gaming server accepts the wager and generates a ticket/receipt confirming that the wager was accepted.

13. The ticket/receipt is then signed by the central gaming server with cryptographic key(s) associated with the individual PGT.

14. The signed ticket/receipt is then transmitted from the central gaming server to the mobile application.

15. The mobile application then relays the ticket/receipt to the PGT.

16. The PGT authenticates the message signature using its cryptographic key(s).

17. Once authenticated, the PGT stores the ticket/receipt so that it can be later presented as proof of winnings.

18. Assuming the consumer has won a prize (award) as a result of the wager, the consumer may present the PGT card in a retail establishment as proof to claim winnings in a manner similar to presenting a paper ticket.

19. The redemption process may also involve an online redemption request that results in the winnings (assuming the amount is very small—e.g., free ticket) added to the PGT scard's play credit via a signed message sent from the central gaming server.

In an alternative embodiment wherein a gaming terminal is used instead of a mobile device, the consumer communicates via NFC with the gaming terminal. In this embodiment, the software that was in the mobile application of the mobile phone is located instead in the gaming terminal.

It should also be noted that while the foregoing disclosure made reference to a single draw game ticket being purchased, generated, validated, etc. the possibility of multiple tickets being purchased, generated, and validated from a single PGT is of course supported as well.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A draw game system that allows consumers to make wagers on a draw game via their respective mobile devices, each of the mobile devices including (i) a communications interface, and (ii) communication circuitry, wherein each wager has a predefined cost, the system comprising:

(a) a plurality of portable microprocessors that are configured to be used while being in the physical possession of the consumers, each portable microprocessor including:

(i) memory that stores:

(A) available game credits, (B) wager data regarding wagers that the consumer makes on the draw game, (C) tickets or receipts for wagers that were made by the consumer on the draw game and which were accepted for game play, (D) a unique identification number of the portable microprocessor, and (E) a unique cryptographic key for the portable microprocessor, (ii) program code executable within the portable microprocessor configured to:

(A) compare the cost of a requested wager to the available game credits, approve the requested wager when the available game credits are sufficient to cover the wager cost, and deduct the wager cost from the available game credits, (B) create a first cryptographically signed message using the unique cryptographic key, the first cryptographically signed message including the unique identification number of the portable microprocessor and the wager data regarding the consumer's requested wager, and (C) authenticate a second cryptographically signed message, using the unique cryptographic key for the portable microprocessor, that includes a ticket or receipt for a wager that was made by the consumer on the draw game and which was accepted for game play, and store the authenticated ticket or receipt in the memory, and (iii) a communications interface that allows for communication of the first and second cryptographically signed messages from and to the portable microprocessor;

(b) a game server that manages the draw game, the game server configured to electronically communicate with the mobile devices via the communication circuitry of the mobile devices, the game server storing:

(i) the plurality of unique identification numbers of the portable microprocessors, and (ii) a plurality of unique cryptographic keys, each of the plurality of unique cryptographic keys being associated with a respective unique cryptographic key of one of the portable microprocessors;

(c) application software program code executable within each of the respective mobile devices, the application software program code configured to:

(i) allow the consumer to request to make a wager on the draw game by entering wager data into the mobile device, and (ii) communicate with one of the portable microprocessors via the communication interfaces of the mobile device and the portable microprocessor, and communicate with the game server via the communication circuitry of the mobile device to:

(A) relay the first cryptographically signed message from the portable microprocessor to the game server, and (B) relay the second cryptographically signed message from the game server to the portable microprocessor; and (d) program code executable within the game server configured to:

(i) authenticate the first cryptographically signed message received from one of the mobile devices using:

(A) the unique identification number of the portable microprocessor included in the first cryptographically signed message, (B) the plurality of unique identification numbers of the portable microprocessors stored in the game server, and (C) the cryptographic key that is associated with the portable microprocessor, (ii) accept for game play the wager in the first cryptographically signed message upon authentication, (iii) generate the second cryptographically signed message that includes the ticket or receipt for a wager that was made by the consumer on the game and which was accepted by the game server, and (iv) communicate the second cryptographically signed message to the mobile device that sent the first cryptographically signed message, wherein the application software program code of the mobile device that sent the first cryptographically signed message to the game server relays the resultant second cryptographically signed message received from the game server to the portable microprocessor for storage therein, and wherein the authenticated ticket or receipt stored in the memory of the portable microprocessor is usable for redemption of any award from a winning wager.

2. The draw game system of claim 1 wherein the communications interface of at least some of the mobile devices and at least some of the portable microprocessors are contactless communications interfaces.

3. The draw game system of claim 2 wherein the contactless communications interfaces include Near Field Communications (NFC) circuitry for performing the communications.

4. The draw game system of claim 1 wherein the mobile device is one of a smartphone, a personal computer, or a tablet computer, and the communication circuitry in the mobile device is wireless communication circuitry.

5. The draw game system of claim 1 wherein the mobile device is a smartphone, the application software program code is a downloaded application, and the communication circuitry in the mobile device is wireless communication circuitry.

6. The draw game system of claim 1 wherein the unique identification number of the portable microprocessor is a Media Access Control (MAC) address assigned to the portable microprocessor.

7. The draw game system of claim 1 wherein the unique cryptographic key for the portable microprocessor is an asymmetrical private key.

8. A draw game system that allows consumers to make wagers on a draw game via a plurality of game terminals, each of the game terminals including (i) a communications interface, and (ii) communication circuitry, wherein each wager has a predefined cost, the system comprising:

(a) a plurality of portable microprocessors that are configured to be used while being in the physical possession of the consumers, each portable microprocessor including:

(i) memory that stores:

(A) available game credits, (B) wager data regarding wagers that the consumer makes on the draw game, (C) tickets or receipts for wagers that were made by the consumer on the draw game and which were accepted for game play, (D) a unique identification number of the portable microprocessor, and (E) a unique cryptographic key for the portable microprocessor, (ii) program code executable within the portable microprocessor configured to:
(A) compare the cost of a requested wager to the available game credits, approve the requested wager when the available game credits are sufficient to cover the wager cost, and deduct the wager cost from the available game credits,
(B) create a first cryptographically signed message using the unique cryptographic key, the first cryptographically signed message including the unique identification number of the portable microprocessor and the wager data regarding the consumer's requested wager, and
(C) authenticate a second cryptographically signed message, using the unique cryptographic key for the portable microprocessor, that includes a ticket or receipt for a wager that was made by the consumer on the draw game and which was accepted for game play, and store the authenticated ticket or receipt in the memory, and
(iii) a communications interface that allows for communication of the first and second cryptographically signed messages from and to the portable microprocessor;
(b) a game server that manages the draw game, the game server configured to electronically communicate with the game terminals via the communication circuitry of the game terminals, the game server storing:
(i) the plurality of unique identification numbers of the portable microprocessors, and
(ii) a plurality of unique cryptographic keys, each of the plurality of unique cryptographic keys being associated with a respective unique cryptographic key of one of the portable microprocessors;
(c) application software program code executable within each of the respective game terminals, the application software program code configured to:
(i) allow the consumer to request to make a wager on the draw game by entering wager data into the game terminal, and
(ii) communicate with one of the portable microprocessors via the communication interfaces of the game terminal and the portable microprocessor, and communicate with the game server via the communication circuitry of the game terminal to:
(A) relay the first cryptographically signed message from the portable microprocessor to the game server, and
(B) relay the second cryptographically signed message from the game server to the portable microprocessor; and
(d) program code executable within the game server configured to:
(i) authenticate the first cryptographically signed message received from one of the game terminals using:
(A) the unique identification number of the portable microprocessor included in the first cryptographically signed message,
(B) the plurality of unique identification numbers of the portable microprocessors stored in the game server, and
(C) the cryptographic key that is associated with the portable microprocessor,
(ii) accept for game play the wager in the first cryptographically signed message upon authentication,
(iii) generate the second cryptographically signed message that includes the ticket or receipt for a wager that was made by the consumer on the game and which was accepted by the game server, and
(iv) communicate the second cryptographically signed message to the game terminal that sent the first cryptographically signed message,
wherein the application software program code of the game terminal that sent the first cryptographically signed message to the game server relays the resultant second cryptographically signed message received from the game server to the portable microprocessor for storage therein, and
wherein the authenticated ticket or receipt stored in the memory of the portable microprocessor is usable for redemption of any award from a winning wager.

9. The draw game system of claim 8 wherein the communications interface of at least some of the game terminals and at least some of the portable microprocessors are contactless communications interfaces.

10. The draw game system of claim 9 wherein the contactless communications interfaces include Near Field Communications (NFC) circuitry for performing the communications.

11. The draw game system of claim 8 wherein the game terminal is a device installed in a retail establishment.

12. The draw game system of claim 8 wherein the unique identification number of the portable microprocessor is a Media Access Control (MAC) address assigned to the portable microprocessor.

13. The draw game system of claim 8 wherein the unique cryptographic key for the portable microprocessor is an asymmetrical private key.

* * * * *